United States Patent
Ghosh et al.

(10) Patent No.: US 11,556,357 B1
(45) Date of Patent: Jan. 17, 2023

(54) SYSTEMS, MEDIA, AND METHODS FOR IDENTIFYING LOOPS OF OR IMPLEMENTING LOOPS FOR A UNIT OF COMPUTATION

(71) Applicant: The MathWorks, Inc., Natick, MA (US)

(72) Inventors: Sumit Ghosh, Natick, MA (US); Vinit Deodhar, Natick, MA (US); Denis Gurchenkov, Needham, MA (US); Zhen Wang, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 17/212,468

(22) Filed: Mar. 25, 2021

(51) Int. Cl.
| G06F 9/44 | (2018.01) |
| G06F 9/445 | (2018.01) |
| G06F 8/41 | (2018.01) |
| G06F 9/30 | (2018.01) |

(52) U.S. Cl.
CPC .......... G06F 9/44578 (2013.01); G06F 8/452 (2013.01); G06F 9/3017 (2013.01); G06F 9/30065 (2013.01)

(58) Field of Classification Search
CPC .... G06F 8/452; G06F 9/30065; G06F 9/3017; G06F 9/44578
USPC .................................................. 717/149–161
See application file for complete search history.

(56) References Cited

U.S. PATENT DOCUMENTS

| 6,772,415 B1 | 8/2004 | Danckaert et al. | |
| 8,577,950 B2* | 11/2013 | Eichenberger ...... | G06F 9/30094 708/607 |
| 8,615,750 B1 | 12/2013 | Iyer et al. | |
| 8,650,240 B2* | 2/2014 | Eichenberger ...... | G06F 9/30014 708/607 |
| 8,671,401 B2 | 3/2014 | Puri et al. | |
| 9,348,587 B2* | 5/2016 | Vorbach .............. | G06F 9/30054 |
| 2006/0048121 A1 | 3/2006 | Blainey et al. | |
| 2006/0048122 A1 | 3/2006 | Barton et al. | |

(Continued)

OTHER PUBLICATIONS

Kruse et al., "User-Directed Loop-Transformations in Clang", 2018, IEEE, pp. 49-58. (Year: 2018).*

(Continued)

*Primary Examiner* — Ted T. Vo
(74) *Attorney, Agent, or Firm* — Cesari and McKenna, LLP

(57) ABSTRACT

Systems, media, and methods may identify loops of a unit of computation for performing operations associated with the loops. The system, media, and methods may receive textual program code that includes a unit of computation that comprises a loop (e.g., explicit/implicit loop). The unit of computation may be identified by an identifier (e.g., variable name within the textual program code, text string embedded in the unit of computation, and/or syntactical pattern that is unique within the unit of computation). A code portion and/or a section thereof may include an identifier referring to the unit of computation, where the code portion and the unit of computation may be at independent locations of each other. The systems, media, and methods may semantically identify a loop that corresponds to the identifier and perform operations on the textual program code using the code portion and/or section.

20 Claims, 28 Drawing Sheets

(56) References Cited

U.S. PATENT DOCUMENTS

2020/0371798 A1* 11/2020 Bhardwaj ................ G06F 9/48

OTHER PUBLICATIONS

Rathore et al., "Performance Evaluation of Matrix Multiplication Using Mix Mode Optimization Techniques and Open MP for Multi Core Processors", 2014, IOSR Journal of Engineering, pp. 19-22. (Year: 2014).*
Singh et al., "Parallel Computing of Matrix Multiplication in Open MP Supported Codeblocks", 2019, Advances and Applications in Mathematical Sciences, pp. 775-787. (Year: 2019).*
Sioutas et al. "Loop Transformations Leveraging Hardware Prefetching," CGO'18, Feb. 24-28, 2018, Vienna, Austria, 11 pages.
Ragan-Kelley et al., "Halide: A Language and Compiler for Optimizing Parallelism, :Locality, and Recomputation in Image Processing Pipelines," PLDI'13, Jun. 16-21, Seattle, WA, 12 pages.
Ragan-Kelley et al., "Halide: Decoupling Algorithms from Schedules for High-Performance Image Processing," Communications of the ACM, Jan. 2018, vol. 61, No. 1, 10 pages.

* cited by examiner

```
function [out] = MatrixMultiply(u,v)                              — 105A                     — 104A
                                                                                     — 101A
    tilingFactor = cost_function(hostProperty('CacheModel'));   — 140
           — 152        — 177           — 145
    schedule = coder.loop.schedule();
    if coder.isColumnMajor — 150
                           — 163A
        schedule = schedule.interchange('i', 'k');  — 155A
    end
    isGPU = coder.gpu.getGpuEnabled;  — 144
    if isGPU — 160
        if coder.isColumnMajor — 165
                                    — 166A
            schedule = schedule.parallelize('k'); — 170A
        else — 175
                                    — 166B
            schedule = schedule.parallelize('i'); — 180A
        end
    else — 185
                            — 168A                          — 168E
        schedule = schedule.tile('j', tilingFactor).tile('i', tilingFactor); — 190A
    end row1 = size(u,1); — 110
    col1 = size(u,2); — 115
    col2 = size(v,2); — 120
    out = zeros(row1, col2); — 126
         — 161                            — 132A
    coder.loop.apply(schedule); — 195
    for i = 1:row1 — 125
        for j = 1:col2 — 130
            for k = 1:col1 — 135
                out(i,j) = out(i,j) + u(i,k) * v(k,j);
            end
        end
    end
end                                                                           — 102A
```

*FIG. 1A*

```
Tag: Interchange('i','k') —152              132A
for i = 1:row1
  for j = 1:col2
    for k = 1:col1
        out(i,j) = out(i,j) + u(i,k) * v(k,j);
      end
    end
  end
```

FIG. 1B

```
                                             196
for k = 1:col1
  for j = 1:col2
    for i = 1:row1
        out(i,j) = out(i,j) + u(i,k) * v(k,j);
      end
    end
  end
```

FIG. 1C

```
function [out] = MatrixMultiply(u,v)
    tilingFactor = cost_function(hostProperty('CacheModel'));
    schedule = coder.loop.schedule();
    if coder.isColumnMajor
        schedule = schedule.interchange('Loop1', 'Loop3');
    end
    isGPU = coder.gpu.getGpuEnabled;
    if isGPU
        if coder.isColumnMajor
            schedule = schedule.parallelize('Loop3');
        else
            schedule = schedule.parallelize('Loop1');
        end
    else
        schedule = schedule.tile('Loop2', tilingFactor).tile('Loop1',tilingFactor);
    end row1 = size(u,1);
    col1 = size(u,2);
    col2 = size(v,2);
    out = zeros(row1, col2);
    coder.loop.apply(schedule);
    for i = 1:row1
        coder.loop.label('Loop1');
        for j = 1:col2
            coder.loop.label('Loop2');
            for k = 1:col1
                coder.loop.label('Loop3');
                out(i,j) = out(i,j) + u(i,k) * v(k,j);
            end
        end
    end
end
```

FIG. 2

```
function [out] = MatrixMultiply(u,v)
    tilingFactor = cost_function(hostProperty('CacheModel'));
    schedule = coder.loop.schedule();
    if coder.isColumnMajor
        schedule = schedule.interchange('Loop11', 'Loop33');
    end
    isGPU = coder.gpu.getGpuEnabled;
    if isGPU
        if coder.isColumnMajor
            schedule = schedule.parallelize('Loop33');
        else
            schedule = schedule.parallelize('Loop11');
        end
    else
        schedule = schedule.tile('Loop22', tilingFactor).tile('Loop11',tilingFactor);
    end row1 = size(u,1);
    col1 = size(u,2);
    col2 = size(v,2);
    out = zeros(row1, col2);
    coder.loop.apply(schedule);

for i = 1:row1 % REFLoop11
        for j = 1:col2 % REFLoop22
            for k = 1:col1 % REFLoop33
                out(i,j) = out(i,j) + u(i,k) * v(k,j);
            end
        end
    end
end
```

FIG. 3

```
function [out] = MatrixMultiply(u,v)                              ─105A          ─104C
┌─────────────────────────────────────────────────────────────────────────────────┐
│ tilingFactor = cost_function(hostProperty('CacheModel'));                       │
│      ─152        ─177           ─145                    ─140                    │
│ schedule = coder.loop.schedule();                                               │
│ if coder.isColumnMajor──150                                                     │
│                       ─163A                                                     │
│     schedule = schedule.interchange('i','k');──155A                             │
│ end                                                                             │
│ isGPU = coder.gpu.getGpuEnabled;──144                                           │
│ if isGPU──160                                                                   │
│     if coder.isColumnMajor──165                                                 │
│                            ─166A                                                │
│         schedule = schedule.parallelize('k');──170A                             │
│     else ──175                                                                  │
│                            ─166B                                                │
│         schedule = schedule.parallelize('i');──180A                             │
│     end                                                                         │
│ else──185                                                                       │
│                        ─168D                                                    │
│         schedule = schedule.tile('j , tilingFactor, jj').                       │
│         parallelize('jj');──190C                                                │
│ end         ─168H                                                               │
└─────────────────────────────────────────────────────────────────────────────────┘
┌─────────────────────────────────────────────────────────────────────────────────┐
│ row1 = size(u,1);──110                                                          │
│ col1 = size(u,2);──115                                                          │
│ col2 = size(v,2);──120                                                          │
│ out = zeros(row1, col2);──126                                                   │
│       ─161                            ─132A                                     │
│ coder.loop.apply(schedule); ──195                                               │
│ ┌─────────────────────────────────────────────────────────────────────────────┐ │
│ │ for i = 1:row1──125                                                         │ │
│ │     for j = 1:col2──130                                                     │ │
│ │         for k = 1:col1──135                                                 │ │
│ │             out(i,j) = out(i,j) + u(i,k) * v(k,j);                          │ │
│ │         end                                                                 │ │
│ │     end                                                                     │ │
│ │ end                                                                         │ │
│ └─────────────────────────────────────────────────────────────────────────────┘ │
└─────────────────────────────────────────────────────────────────────────────────┘
end                                                                     ─102A
```

FIG. 4

```
101E 105B                      104D
function [out] = MatrixAdd (u,v)
        152          177
    schedule = coder.loop.schedule();  145
    loopLevelCount = ndims(v);  134
                                                      137
    schedule = schedule.associateLoopLevelsWithNames
    (0, 'i', loopLevelCount-1, 'j');  136
    if coder.isColumnMajor  150
                                      163D
        schedule = schedule.interchange('i','j');  155C
    end
    isGPU = coder.gpu.getGpuEnabled;  144
    if isGPU  160
        if coder.isColumnMajor  165
                                      166G
            schedule = schedule.parallelize('j');  170C
        else                          166B
            schedule = schedule.parallelize('i');  180A
        end
    end assert(ndims(u) == ndims(v));  133
           161
    coder.loop.apply(schedule);  195
    out = u + v;
         132C
end                                                  102C
```

FIG. 5

```
function [out] = MatrixMultiply(u,v)                    — 105A
    schedule = generateSchedule();                       — 171
    row1 = size(u,1);                                    — 110
    col1 = size(u,2);                                    — 115
    col2 = size(v,2);                                    — 120
    out = zeros(row1, col2);                             — 126
    coder.loop.apply(schedule);                          — 195
    for i = 1:row1                                       — 125
        for j = 1:col2                                   — 130
            for k = 1:col1                               — 135
                out(i,j) = out(i,j) + u(i,k) * v(k,j);
            end
        end
    end
end
```

FIG. 6A

```
function schedule = generateSchedule()
    tilingFactor = cost_function(hostPreperty('CacheMode'));
    schedule = coder.loop.schedule();
    if coder.isColumnMajor
        schedule = schedule.interchange('i','k');
    end isGPU = coder.gpu.getGpuEnabled;
    if isGPU
        if coder.isColumnMajor
            schedule = schedule.parallelize('k');
        else
            schedule = schedule.parallelize('i');
        end
    else
        schedule = schedule.tile('j', tilingFactor).tile('i', tilingFactor);
    end
end
```

*FIG. 6B*

```
scheduleForLargeCache = generateScheduleForGivenCacheSize(64);   ──701 codegen MatrixMultiplyWithScheduleAsInput.m -args {rand([512,    ⎫
512]), rand([512,512]), coder.Constant(scheduleForLargeCache) }  ⎬──702
-d GeneratedCodeFolderForLargeCache                              ⎭
```

```
function schedule = generateScheduleForGivenCacheSize(cacheSize)  ──104F / 805 tilingFactor = ceil sqrt((cacheSize*1024)/3));   ──810
                  ──152
    schedule = coder.loop.schedule();   ──145
              ──177      ──168A
    schedule = schedule.tile('j', tilingFactor).tile('i',   ──168E
    tilingFactor);   ──190A
end
```

900 ⤵ function [out] = MatrixMultiplyWithScheduleAsInput(u, v,  ─905
schedule)

```
row1 = size(u,1);      ──110
col1 = size(u,2);      ──115
col2 = size(v,2);      ──120 out = zeros(row1, col2);   ──126
         ──161
coder.loop.apply(schedule);  ──195
```
                                              ╱──132A
```
for i = 1:row1    ──125
    for j = 1:col2    ──130
        for k = 1:col1    ──135
            out(i,j) = out(i,j) + u(i,k) * v(k,j);
        end
    end
end
```
end
                    FIG. 7C        ╲── 102A

```
                                        1000
                                                                        132A for i = 1:row1 —— 125
        for j = 1:col2 —— 130
            for k = 1:col1 —— 135
                out(i,j) = out(i,j) + u(i,k) * v(k,j);
            end
        end
    end
    ┌─────────────────────────────┐
    │ Loop 'i' fusible with Loop 'x' │ —— 1005
    └─────────────────────────────┘ for x = 1:row1 —— 922
        for y = 1:col2 —— 923
            for z = 1:col1 —— 924
                out(x,y) = out(x,y) + u(x,z) * v(z,y);
            end
        end
    end
                                                                        955
```

FIG. 8

```
                                                    1105
                                                   ↙
function [out] = MatrixMultiplyForProfile(...) ⤺1112  104Y
                                                     ↙
   ┌─────────────────────────────────────────────────┐
   │    ⌒152        ⌒177                             │
   │ schedule = coder.loop.schedule();  ⌒145         │
   │                    ⌒1113A          ⌒1110A       │
   │ schedule = schedule.profile('i');               │
   └─────────────────────────────────────────────────┘
                                                  102Z
                                                 ↙
   ┌─────────────────────────────────────────────────┐
   │           ⌒161                       132A       │
   │ coder.loop.apply(schedule); ⌒195    ↙           │
   │   ┌─────────────────────────────────────────┐   │
   │   │ for i = 1:row1 ⎯125                     │   │
   │   │     for j = 1:col2 ⎯130                 │   │
   │   │         for k = 1:col1 ⎯135             │   │
   │   │             out(i,j) = out(i,j) + u(i,k) * v(k,j); │
   │   │         end                             │   │
   │   │     end                                 │   │
   │   │ end                                     │   │
   │   └─────────────────────────────────────────┘   │
   └─────────────────────────────────────────────────┘
 end
```

*FIG. 9A*

| Line Number | Code | Calls | Total Time(s) | % Time |
|---|---|---|---|---|
| 14 | out(i,j) = out(i,j) + u(i,k) * v(k,j); | 226825125 | 15.449 | 60.3% |
| 15 | end | 226825125 | 10.148 | 39.6% |
| 16 | end | 140412 | 0.015 | 0.1% |
| 13 | for k = 1:col1 | 140413 | 0.009 | 0.0% |
| 17 | end | 254 | 0.001 | 0.0% |
| | | | | |
| Totals | | | 25.622 | 100% |

```
function [out] = MatrixMultiplyForProfileTransform(c,.....)  ⟵1120  ⟵104N schedule = coder.loop.schedule();  ⟵152  ⟵177  ⟵145
    schedule = schedule.profile('i','k');  ⟵1110B  ⟵1113B
    if c % true/false  ⟵1150  ⟵163A
        schedule = schedule.interchange('i','k');  ⟵155A
    end

⟵1130                                                        ⟵102Z coder.loop.apply(schedule);  ⟵161  ⟵195  ⟵132A
    for i = 1:row1  ⟵125
        for j = 1:col2  ⟵130
            for k = 1:col1  ⟵135
                out(i,j) = out(i,j) + u(i,k) * v(k,j);
            end
        end
    end
end
```

| Line Number | Code | Without Loop Transformation Operation | | With Loop Interchange Operation | |
|---|---|---|---|---|---|
| | | Total Time(s) | %Time | Total Time(s) | %Time |
| 8 | for i = 1:row1 | 0.002 | 0.012927413 | 0.005 | 0.090530509 |
| 9 | for j = 1:col2 | 0.004 | 0.025854825 | 0.003 | 0.054318305 |
| 10 | for k = 1:col1 | 0.009 | 0.058173357 | 0.001 | 0.018106102 |
| 11 | out(i,j) = out(i,j) + u(i,k)* v(k,j); | 15.449 | 99.85779846 | 5.508 | 99.72840847 |
| 12 | end | 0.004 | 0.025854825 | 0.001 | 0.018106102 |
| 13 | end | 0.002 | 0.012927413 | 0.002 | 0.036212204 |
| 14 | end | 0.001 | 0.006463706 | 0.003 | 0.054318305 |
| | Totals | 15.471 | 100 | 5.523 | 100 |

FIG. 9D

```
function [out] = SummingOperationDeploy(limit)
    schedule = coder.loop.schedule();
    schedule = schedule.parallelize('i');
    GPUthreshold = 1000;
    if limit > GPUthreshold
    schedule = schedule.deployToGpu('i');
    end coder.loop.apply(schedule);
    for i = 1:limit
        out = out + i;
    end
end
```

FIG. 10

```
                                                         1305
1300                                                    ↙
function [out] = AddOffsetsTwiceToMatrix(out, offset1, offset2)
      ┌─152        ┌─177          ┌─145
      schedule = coder.loop.schedule();                 104Z
      schedule = schedule.fusible('i','m');  ─1345
                                   ─1333 row = size(out,1)/2; ─1310
  col = size(out,2);   ─1315
              ─161
  coder.loop.apply(schedule); ─195
  for times = 1:2 ─1362                              ─132K
      ┌─────────────────────────────────────────┐
      │ for i = 1:row  ─1325                    │
      │     for j = 1:col  ─1330                │
      │         out(i,j) = out(i,j) + offset1;  │
      │     end                                 │
      │ end                                     │
      └─────────────────────────────────────────┘
                                                    ─132J
      ┌─────────────────────────────────────────────┐
      │ for m = 1:row  ─1335                        │
      │     for n = 1:col ─1340                     │
      │         out(m+row,n) = out(m+row,n) + offset2; │
      │     end                                     │
      │ end                                         │
      └─────────────────────────────────────────────┘
  end
end
                    FIG. 11A              ─102H
```

```
function [out1, out2] = commentExample(out1, out2, row1, col2)
%#LOOPSPEC fusible(i,x)
```

```
for i = 1:row1
    for j = 1:col2
        for k = 1:col1
            out(i,j) = out(i,j) + u(i,k) * v(k,j);
        end
    end
end
```

```
for x = 1:row1
    for y = 1:col2
        for z = 1:col1
            out(x,y) = out(x,y) + u(x,z) * v(z,y);
        end
    end
end
```

FIG. 11B

```
function [out] = xLoopParallelize(u,v)
    schedule = coder.loop.schedule();
    schedule = schedule.parallelize('i');

row = size(u,1);
    col = size(u,2);
    out = zeros(row, col);
    coder.loop.apply(schedule);
    for i = 1:col
        for j = 1:row
            out(i,j) = out(i,j) + u(i,j) * v(i,j);
        end
    end
end
```

FIG. 12A

```
void xLoopParallelize(const double u[262144], const double v[262144], double out[262144])
{
    int i;
    int j;
    int out_tmp;
    memset(&out[0], 0, 262144U * sizeof(double));
#pragma omp parallel for num_threads(omp_get_max_threads()) private(j, i, out_tmp)
    for (i = 0; i < 512; i++) {
        for (j = 0; j < 512; j++) {
            out_tmp = i + (j << 9);
            out[out_tmp] += u[out_tmp] * v[out_tmp];
        }
    }
}
```

FIG. 12B

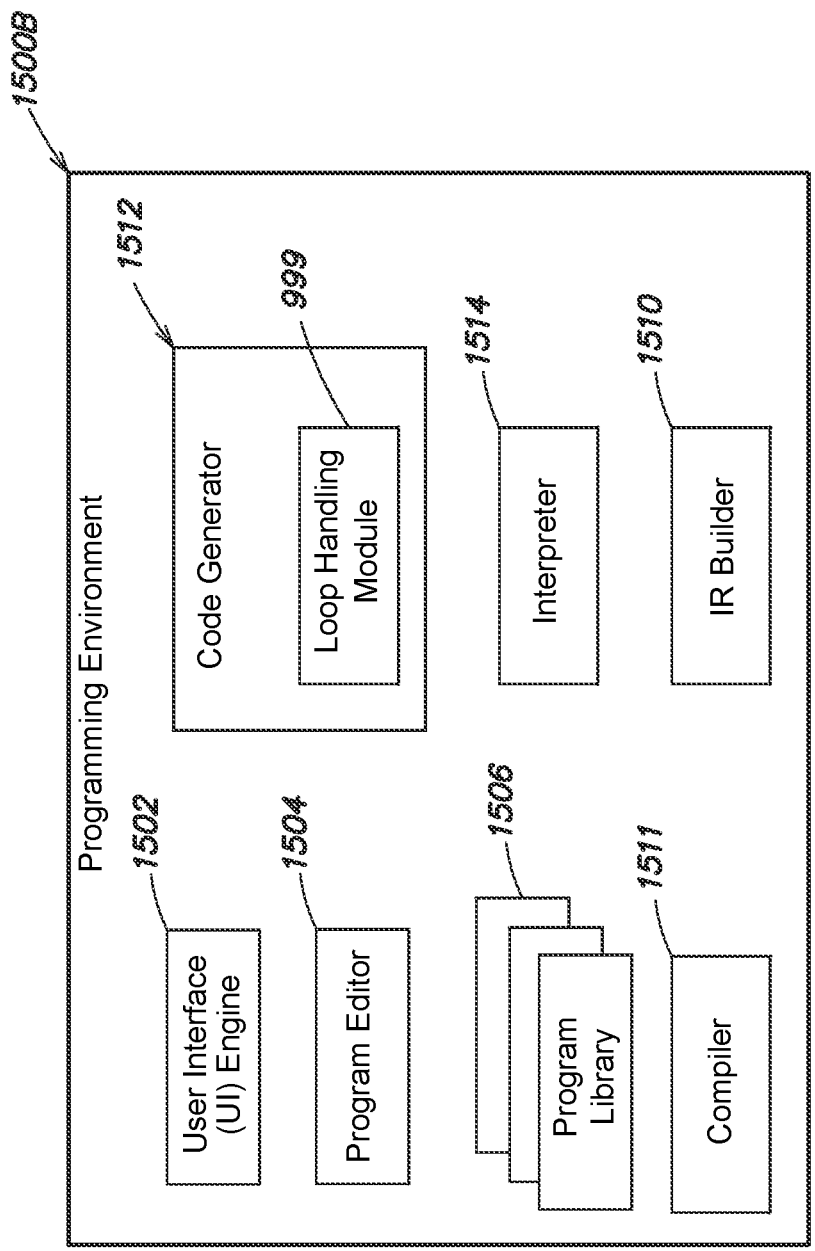
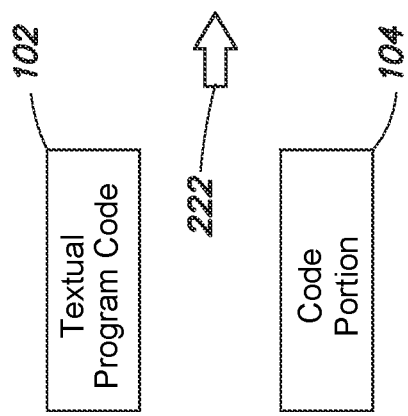
FIG. 14B

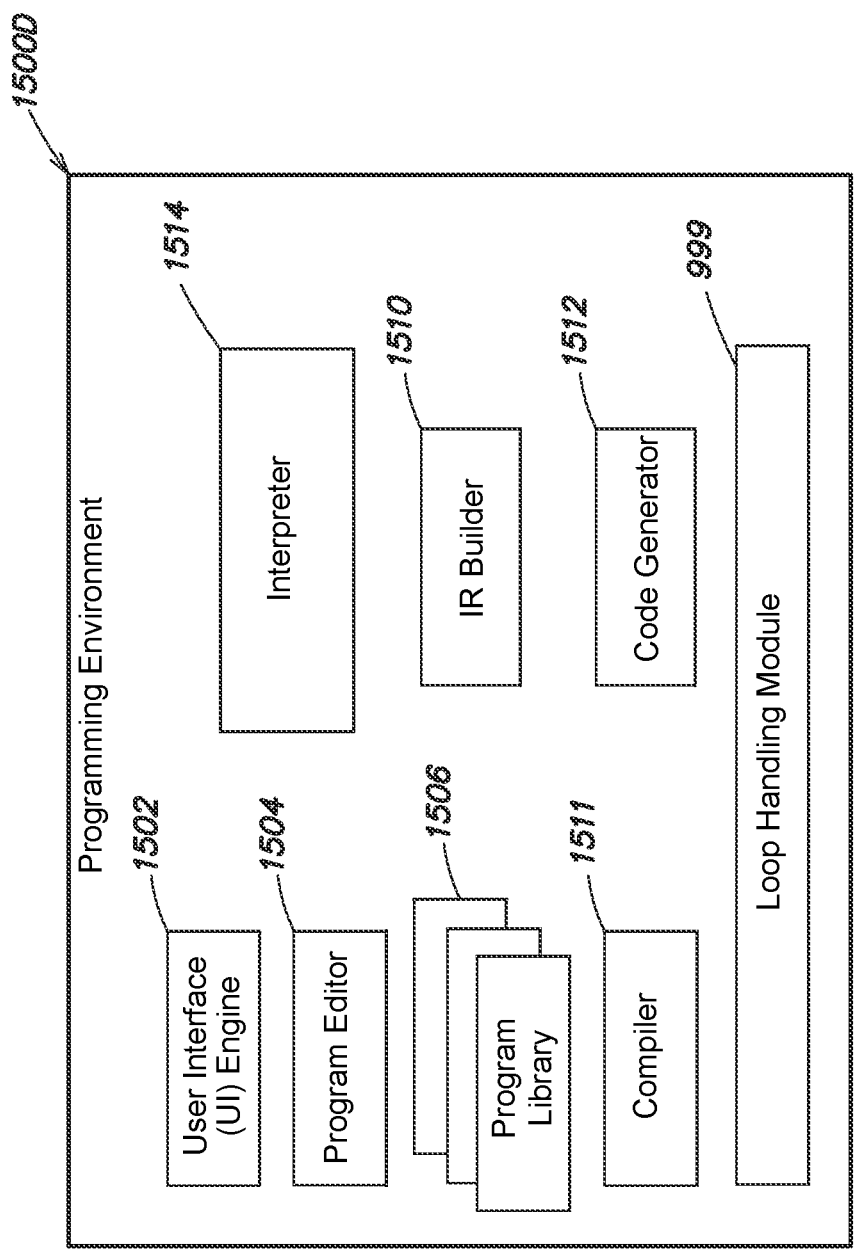
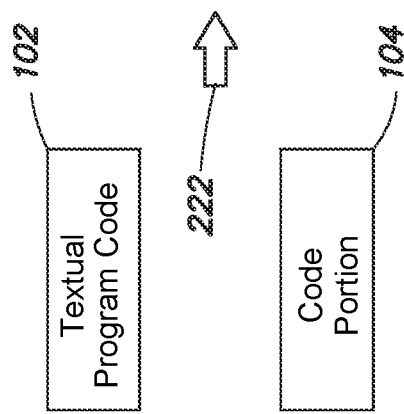
FIG. 14D

SYSTEMS, MEDIA, AND METHODS FOR IDENTIFYING LOOPS OF OR IMPLEMENTING LOOPS FOR A UNIT OF COMPUTATION

BRIEF DESCRIPTION OF THE DRAWINGS

The description below refers to the accompanying drawings, of which:

FIG. 1A is example program code that includes a code portion that utilizes variable names, which identify loops of a unit of computation, to perform loop transformation operations according to one or more embodiments described herein;

FIG. 1B is an example unit of computation associated (e.g. tagged) with a code portion according to one or more embodiments describe herein;

FIG. 1C is an example transformed unit of computation based on the unit of computation associated (e.g., tagged) with the code portion of FIG. 1B according to one or more embodiments described herein;

FIG. 2 is example program code that includes a code portion that utilizes syntactical patterns (e.g., labels, quoted strings, statements, or other language constructs) that identify loops of a unit of computation, to perform loop transformation operations according to one or more embodiments described herein;

FIG. 3 is example program code that includes a code portion that utilizes another syntactical pattern (e.g., text strings) that identifies loops of a unit of computation, to perform loop transformation operations according to one or more embodiments described herein;

FIG. 4 is example program code that includes a code portion that utilizes another syntactical pattern (e.g., a variable name), derived based on an execution of a loop scheduling function and that identifies a loop, to perform a loop transformation operation according to one or more embodiments described herein;

FIG. 5 is example program code that includes a code portion that utilizes another syntactical pattern (e.g., variable names) that identify implicit loops of a unit of computation, to perform loop transformation operations according to one or more embodiments described herein;

FIGS. 6A and 6B are respectively a unit of computation and a code portion that can be stored in different files, locations (e.g., arbitrary or independent locations in the same file), modules, other structural elements of a program, or stored at the same or different storage devices, where the code portion utilizes variable names that identify loops of the unit of computation, to perform loop transformation operations according to one or more embodiments described herein;

FIG. 7A is an example in which program code and a code portion are provided to a code generation process and during the process, loop transformation operations are performed according to one or more embodiments described herein;

FIG. 7B is an example code portion that utilizes variable names to identify loops in a unit of computation and that is utilized as input information to the code generation process of FIG. 7A according to one or more embodiments described herein;

FIG. 7C is example textual program code with a unit of computation that is utilized as input information to the code generation process of FIG. 7A according to one or more embodiments described herein;

FIG. 8 is an example program code with a corresponding report generated for units of computation utilizing variable names that identify loops according to one or more embodiments described herein;

FIGS. 9A and 9B are respectively program code and corresponding profiling information that may be generated for a unit of computation utilizing a variable name that identifies a loop according to one or more embodiments described herein;

FIGS. 9C and 9D are respectively program code and corresponding profiling information that may be generated to provide a comparison of a unit of computation before and after performing a loop transformation operation according to one or more embodiments described herein;

FIG. 10 is example program code for generating deployment code, that implements a unit of computation, that may be deployed in a heterogeneous architecture environment utilizing a variable name that identifies a loop according to one or more embodiments described herein;

FIG. 11A is example program code with units of computation that may be analyzed utilizing variable names that identify loops to provide an indication in a code portion regarding a relationship between the units of computation according to one or more embodiments described herein;

FIG. 11B is example program code with units of computation that may be analyzed utilizing variable names that identify loops to provide an indication in a comment regarding a relationship between the units of computation according to one or more embodiments described herein;

FIG. 12A is example program code that utilizes a variable name, which identifies a loop of a unit of computation, that can be used to generate other program code that includes a transformed unit of computation according to one or more embodiments described herein;

FIG. 12B is example program code that includes a transformed unit of computation that is generated from the unit of computation of FIG. 12A, where the transformed unit of computation performs an operation of the unit of computation and implements a loop transformation operation according to one or more embodiments described herein;

FIG. 14A-14E are schematic, partial illustrations of example programming environments in accordance with one or more embodiments described herein;

DETAILED DESCRIPTION OF AN ILLUSTRATIVE EMBODIMENT

Figure 13:
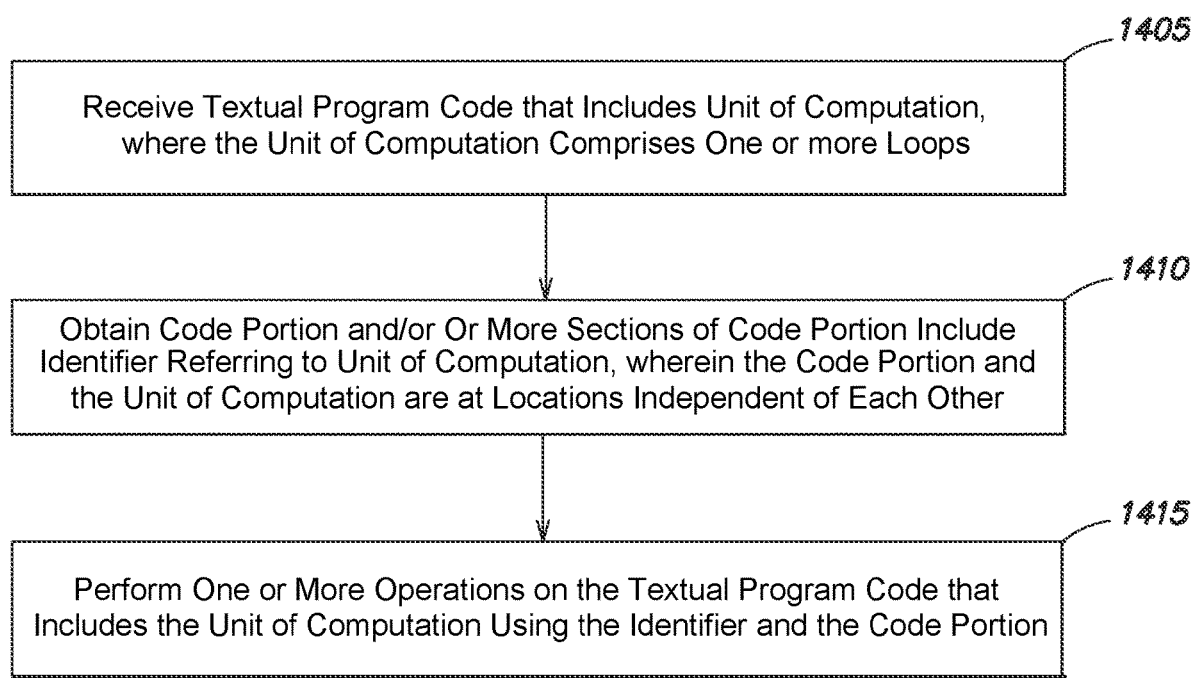
FIG. 13 is a flow diagram of an example method for identifying loops of a unit of computation using variable names, identifiers, or syntactic patterns, and performing one or more operations associated with the loops utilizing the variable names, identifiers, or syntactical patterns.

Textual program code, that implements an algorithm that includes one or more units of computation, may be created or used in a programming environment, e.g., a textual, a graphical, or hybrid (in which combined textual and graphical programming is supported) programming environment. The textual program code can be in an imperative language, a declarative language, or a combination of different types of languages. The units of computation can be sections of program code, e.g., a function, a module, a package, a class, a sequence of statements or expressions, such as a loop nest. The units of computation may include one or more control flows, which can include statements (e.g., conditional statements, loop statements, etc.) for one or more control flow operations that may control a logical flow of the textual program code during its execution. Examples of control flows include loops, if-else operations, switch operations, branching operations, or a control flow that is implicit in a higher-level expression such as a matrix multiplication or an array addition.

Deployment code, e.g., the textual program code that includes the unit of computation or other code that implements the unit of computation and is generated from the textual program code, may be deployed on a target system that may be software, hardware, or a combination thereof. Examples of such target systems may include, but are not limited to, processor architectures, operating systems, hardware systems such as mobile devices or supercomputers, cloud-based services (e.g., Microsoft® Azure, AWS Lamda provided by Amazon), virtual machines, runtime environments (e.g., Node.js or Java Virtual Machine), and/or other implementations of programming languages. Different target systems may have different characteristics that may require or warrant a change to an implementation of the deployment code such that desired performance on the target system is achieved.

Control flow performance, e.g., loop performance of one or more loops, may affect and contribute to an overall performance of the deployment code on the target system. In some implementations, scheduling code is executed to schedule the program code such that control flow performance may be changed based on different performance criteria. Example performance criteria can include reduced latency, higher throughput, reduced power consumption, etc. The performance criteria may be parameterized by hardware/software selection, user choice, etc. To achieve the desired performance during compilation, code generation, deployment, and/or execution on the target system, the scheduling code may include one or more loop transformations that may be applied to the loops of the program code, where a loop transformation may change an order in which individual instructions or operations inside a loop (or a number of loops) execute. By applying loop transformations, runtime performance characteristics, such as execution speed, on the target system and/or overhead associated with a loop (e.g., loop index increment and conditional check operations) may be improved. In addition, loop transformations may, for example, be utilized to improve cache performance and/or make effective use of parallel processing capabilities at the target system.

With some conventional techniques that are associated with textual program code, the program code for the loop transformations, which may be referred to as "scheduling code", and program code for the algorithm, i.e., algorithmic code, are interwoven with each other. Therefore, updating the scheduling code and/or algorithmic code may be tedious and inefficient for a user as it may require the user to identify and/or differentiate the algorithmic code from the scheduling code in the program and make consistent changes throughout the code. In other examples, e.g., Halide, program code for the algorithm and scheduling code for scheduling execution of the algorithm may be non-interwoven, but the scheduling code and the algorithmic code are necessarily located dependent of each other, for example, the locations are determined by certain constraints. Examples of the location dependency include the two types of code being in the same function and/or the scheduling code immediately following the algorithmic code. As such, and with these other conventional techniques, utilizing the algorithmic code with different scheduling codes can be inefficient and a tedious process.

Briefly, the present disclosure relates to systems and methods for identifying loops of a unit of computation for performing one or more operations associated with the loops.

Specifically, the systems and methods may receive textual program code that includes a unit of computation, wherein the unit of computation comprises one or more loops. In an embodiment, the unit of computation may include an explicit loop statement (e.g., explicit program syntax for a loop), and thus the loop of the unit of computation may be referred to as an explicit loop. When the unit of computation does not include an explicit loop statement (e.g., an element-wise matrix addition represented by program syntax u+v where u and v are matrices) but the unit of computation utilizes a loop, the loop of the unit of computation may be referred to as an implicit loop. In addition or alternatively, array-based operations of a unit of computation may also be referred to as implicit loops according to the one or more embodiments described herein.

The one or more embodiments described herein may be utilized with explicit and/or implicit loops. The unit of computation, e.g., the loop of the unit of computation, may be associated with an identifier. For example, the identifier, i.e., symbolic identifier, may be a variable name within the textual program code. In addition or alternatively, the identifier may be a syntactical pattern (e.g., text string) embedded in the unit of computation. In addition or alternatively, the identifier may be another syntactical pattern (e.g., labels, quoted strings, statements, or other language constructs) that is unique within the unit of computation.

A code portion and/or one or more sections of the code portion may include an identifier referring to the unit of computation. In an embodiment, the code portion may be scheduling code that, for example, may include one or more loop scheduling functions. The code portion may be semantically linked to the loop of the unit of computation through the identifier. In an embodiment, the code portion can represent scheduling execution of loops (e.g., performing loop transformation operations), generating reports for loops (e.g., a report indicating that two loops are fusible), generating information for a loop (e.g., generating execution time information for a loop), deploying (including replacing or placing) the unit of computation on a device (e.g., target system) when the unit of computation is implemented in a heterogeneous architecture of the device (e.g., generating syntactically different deployment codes that are semantically equivalent), and/or indicating a relationship between loops (e.g., a user indicating that two loops are fusible).

The code portion and the unit of computation may be at locations independent of each other. In an embodiment, the code portion may be in any location in textual program code that contains the unit of computation. In an embodiment, the code portion and the unit of computation may be stored in different files, locations (e.g., arbitrary or independent locations in the same file), modules, other structural elements of a program, or stored at the same or different storage devices. Therefore, the code portion, e.g., loop scheduling function included in the code portion, is not required to be at a particular location with respect to the unit of computation such that the code portion can operate on, for example, the textual program code.

The methods and systems may perform one or more operations on the textual program code that includes the unit of computation using the identifier and at least a section of the code portion. Specifically, and in an embodiment, the methods and systems may identify the unit of computation or a part of the unit of computation using the identifier included in the section of the code portion. For example, a loop corresponding to the identifier included in the section of the code portion is identified. In an embodiment, and based on a result of identifying, the process may perform the one or more operations on the textual program code, e.g., unit of computation of the textual program code, utilizing the section of the code portion. For example, and as will be described in further detail below, the one or more operations performed on the textual program code may comprise one or more of: (1) analyzing the unit of computation, wherein the analyzing includes identifying one or more properties of the unit of computation (e.g., two loops iterate over the same range), or determining a relationship between the unit of computation and another unit of computation (e.g., two loops are fusible), (2) transforming the unit of computation, wherein the transforming includes scheduling execution of the unit of computation, e.g., performing a loop transformation operation on a loop or the executable code generated from the unit of computation utilizing an identifier for the loop, or modifying an execution of one or more particular loops associated with the unit of computation, e.g., parallelizing execution of a loop, (3) deploying or placing the unit of computation on a hardware system or a heterogenous architecture (e.g., semantically equivalent deployment codes that are syntactically different may be generated from the same unit of computation utilizing an identifier for a loop), (4) instrumenting the unit of computation, wherein the instrumenting includes inserting one or more instructions into the unit of computation, and/or (5) generating a report or information for the unit of computation.

In an implementation, the one or more embodiments described herein may be performed during preprocessing, compilation, code generation, and/or translation. Preprocessing, compilation, code generation, and/or translation may be performed inside a same process or separate processes by tools commonly known as a pre-processor, compiler, code generator, and/or translator. During compilation, a compiler may perform a series of processes on the textual program code. Such processes may include, but are not limited to, lexical analysis, parsing, semantic analysis (syntax-directed translation), conversion of the textual program code to an intermediate representation, code optimization, scheduling, etc. After compilation, a code generator may generate deployment code from the textual program code and for the target system, where the deployment code implements the unit of computation on the target system.

Figure 14A:
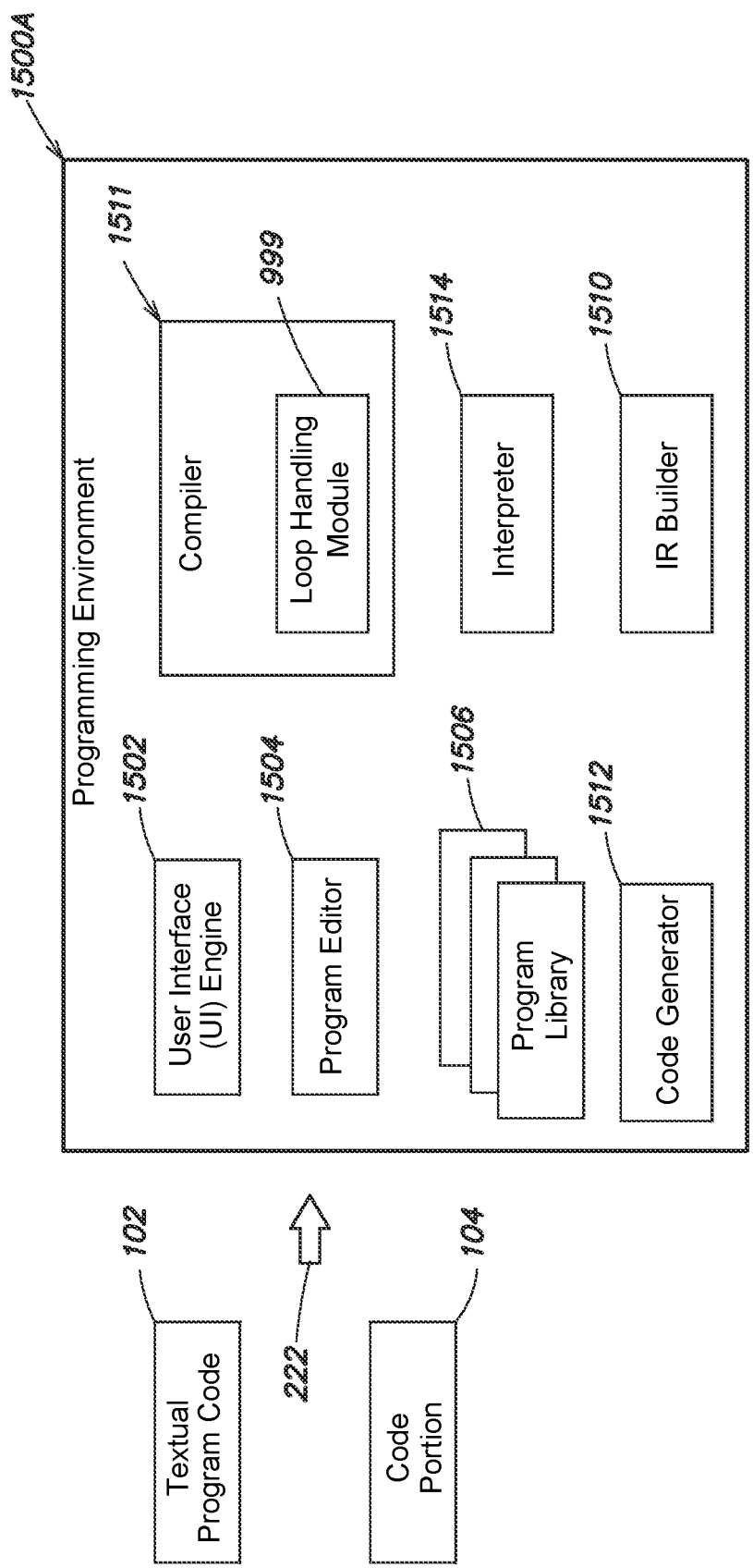

In an implementation, a loop handling module 999 may be part of compiler 1511 as depicted in FIG. 14A and may perform the one or more embodiments described herein during compilation. In an implementation, the loop handling module 999 may be part of code generator 1512 as depicted in FIG. 14B and may perform the one or more embodiments described herein during code generation.

In an embodiment, a compiler/code generator may perform the compilation and code generation as described above and the one or more embodiments described herein may be performed during the compilation/code generation process. In an implementation, the loop handling module 999 may be part of compiler/code generator 1508 as depicted in FIG. 14E and may perform the one or more embodiments described herein during the compilation/code generation process.

Figure 14C:
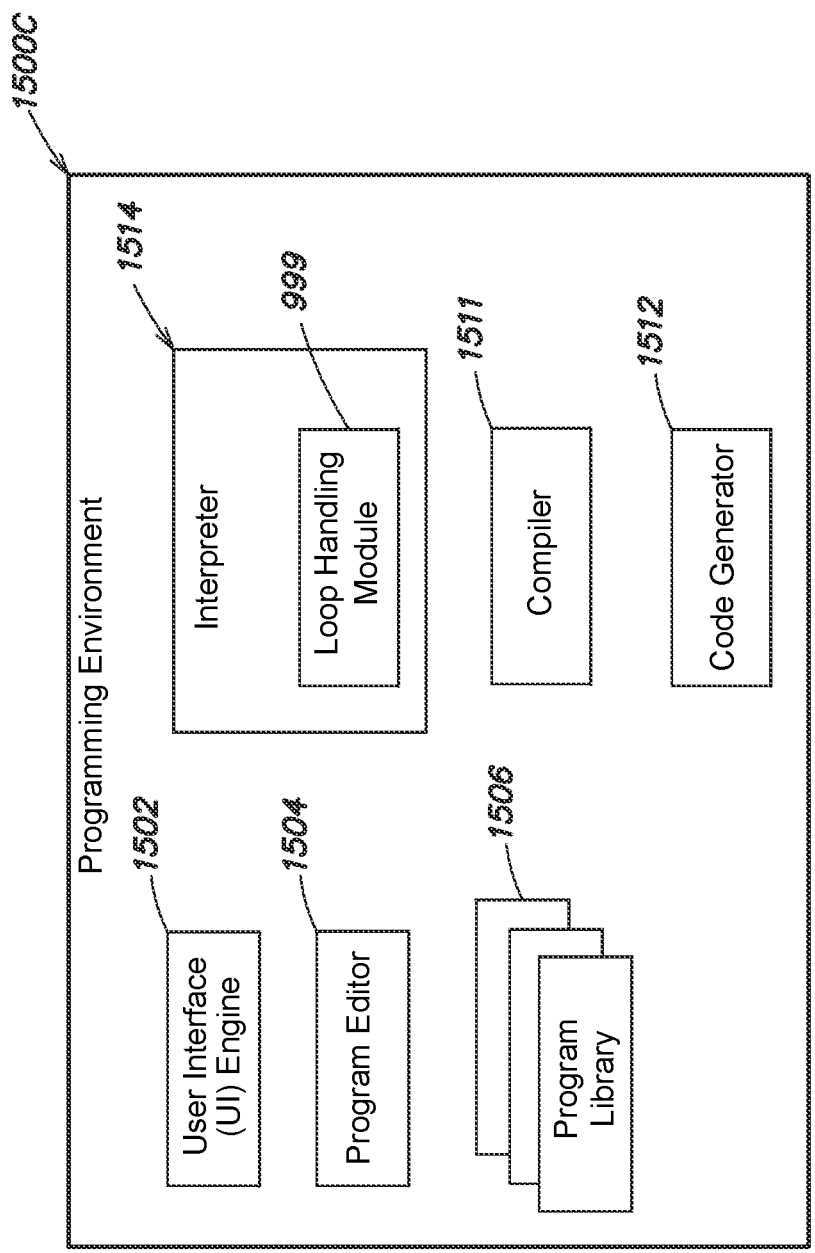
Figure 14E:
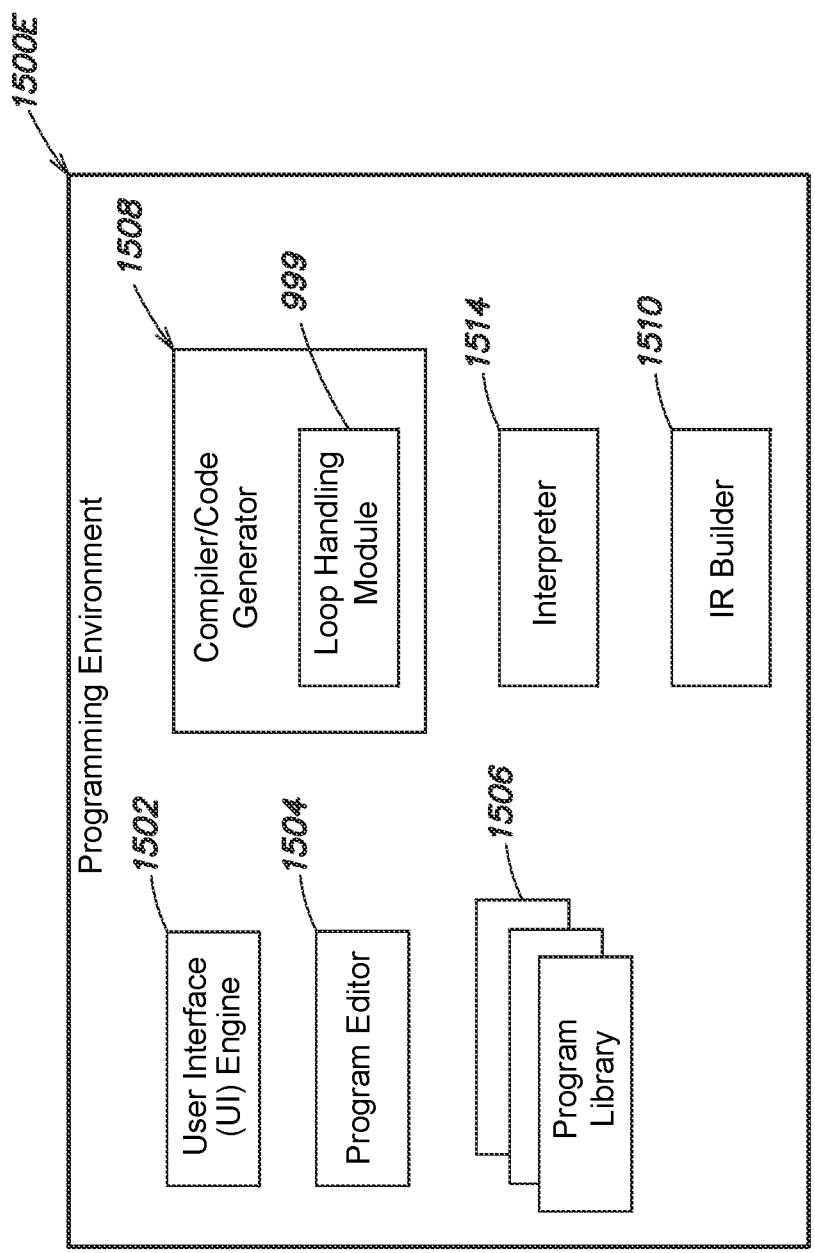

In an implementation, the loop handling module 999 that may perform the one or more embodiments described herein may be part of an interpreter 1514 as depicted in FIG. 14C. In an implementation, the loop handling module 999 that may perform the one or more embodiments described herein may be hardware, e.g. part of a scheduling unit, and internal to a processor 2002 of a data processing system 2000 of FIG. 15. In an implementation, the loop handling module 999 may be independent of a compiler, a code generator, a compiler/code generator, an interpreter, and/or a processor as depicted in FIG. 14D.

FIG. 1A is example program code that includes a code portion that utilizes variable names, which identify loops of a unit of computation, to perform loop transformation operations according to one or more embodiments described herein.

Program code 101A may include one or more lines of code that may be provided as input to a computing device, from a user utilizing, for example, an input device, such as a keyboard, of the computing device. Alternatively, program code 101A may be predefined and provided, at least in part, from an external source (e.g., an external computing device, external storage device, etc.), to the computing device.

Program code 101A may include code line 105A that may be a header for a function named MatrixMultiply that may be utilized to execute a matrix multiplication operation on a target system. The MatrixMultiply function may have input information that includes input variables u and v. In this example, u may be an m×n sized matrix, while v may be a n×p sized matrix. The values of matrix u and matrix v may change based on different invocations of the matrix multiplication operation on the target system, and the values may be utilized during execution of the matrix multiplication operation on the target system. MatrixMultiply may also include output variable out, which may store an output of the execution of the matrix multiplication operation.

Textual program code 102A may include code lines 110, 115, and 120 that may respectively create variables named row1, col1, and col2. Row1 may store a value that is equal to the number of rows (e.g., m) of matrix u. Col1 may store a value that is equal to the number of columns (e.g., n) of matrix u. Col2 may store a value that is equal to the number of columns (e.g., p) of matrix v. Code line 126 may initialize all values of out, which is a row1×col2 sized matrix, to zeros. The values of the created variables may be utilized during execution of the matrix multiplication operation.

The textual program code 102A may further include a unit of computation 132A that includes code lines that correspond to loops 125, 130, and 135 that are utilized to perform the matrix multiplication operation. Although reference is made to loops 125, 130, and 135 collectively being unit of computation 132A (i.e., algorithmic code) as depicted in FIG. 1A, it is expressly contemplated that each of the loops individually may be referred to as a unit of computation. In addition, each of the loops 125, 130, and 135 may be referred to as an explicit loop including a corresponding explicit loop statement, e.g., "for i=1:row1", in the unit of computation 132A of the textual program code 102A.

According to the one or more embodiments described herein and as described in further detail below, an identifier may be determined for each of the loops 125, 130, and 135, and the identifiers for the loops may be utilized to semantically refer to and semantically identify the loops such that loop transformation operations may be performed for the loops 125, 130, and 135.

Loop 125, which may be an outermost loop and started by "for i=1:row1", utilizes a variable named i (i.e., an iteration variable) to increment a row position to perform the matrix multiplication operation. The loop handling module 999 may semantically analyze textual program code 102A and identify the variable name i and determine that because loop 125 is stated utilizing the variable name i, the variable name i can be an identifier that may be utilized to semantically refer to and identify loop 125. Loop 130, which may be a next inner loop and started by "for j=1:col2", utilizes a variable named j (i.e., an iteration variable) to increment a column position to perform the matrix multiplication operation. The loop handling module 999 may semantically analyze textual program code 102A and identify the variable name j and determine that because loop 130 is stated utilizing the variable name j, the variable name j can be an identifier that is utilized to semantically refer to and identify loop 130. Loop 135, which may be an innermost loop and started by "for k=1:col1", utilizes a variable named k (i.e., an iteration variable) to perform a dot product of an ith row of matrix u with a jth column of matrix v to perform the matrix multiplication operation. The loop handling module 999 may semantically analyze textual program code 102A and identify the variable name k and determine that because loop 135 is stated utilizing the variable name k, the variable name k can be utilized as an identifier to semantically refer to and identify loop 135.

As will be described in further detail below, the determined identifiers, e.g., variable names i, j, and k, may be used in code portion 104A of program code 101A to semantically refer to loops 125, 130, and 135, such that the loops 125, 130, and 135 may be semantically identified and loop transformation operations may be performed for the loops 125, 130, and 135.

Code portion 104A may include loop scheduling functions (e.g., "schedule.interchange of code line 155A, schedule.parallelize of code lines 1701A and 180A, schedule.tile of code line 190A, etc.) that perform the loop transformation operations and include variable names 'i', 'j', and 'k' that are used to semantically refer to and identify loops 125, 130, and 135. The variable names, e.g., 'i', 'j', and 'k', may be referred to as identifiers for the loops or symbolic identifiers for the loops. In addition, code portion 104A may include program constructs (e.g., if statements, else statements) is that define different conditions.

The loop handling module 999 may process the code portion 104A (e.g., process from top to bottom and line-by-line) to add one or more loop scheduling functions to a generated object, e.g., schedule object 152 of code portion 104A, based on certain conditions of code portion 104A being satisfied. The generated object with the added loops scheduling functions may be referred to as a "schedule" or a "generated schedule". As will be described in further detail below, the schedule may be applied to the unit of computation 132A by semantically identifying the loops and performing loop transformation operations on the semantically identified loops.

Advantageously, a user that creates or modifies code portion 104A has the flexibility to configure the conditions and/or the loop scheduling functions that perform the loop transformation operations, such that the loop transformation operations satisfy hardware/software constraints, user preferences, etc. When conditions and/or loop scheduling functions of code portion 104A conflict and/or contend with each other, the loop handling module 999 may generate one or more errors, warnings, or notices that may be provided to the user, e.g., displayed on a display device of a computing device operated by the user. An example of conflicting/contending loop scheduling functions may be when a condition in the code portion causes loop tiling to be performed for a loop with a tiling factor, and the same condition somewhere else in the code portion causes loop tiling to be performed for the same loop with a different tiling factor. As such, the user may learn or be informed of the conditions and/or loop scheduling functions that may conflict and/or contend such that the user can modify code portion 104A.

In addition, and as will be described in further detail below, the user can semantically refer to loops 125, 130, and 135 utilizing variable names i, j, and kin the creation/modification of code portion 104A such that the loop transformation operations can be performed for the loops 125, 130, and 135. Therefore, the one or more embodiments described herein allow for loop transformation operations to be specified utilizing the identifiers for the loops.

Such loop transformation operations that may be performed may include, but are not limited to, a loop tiling operation, a loop parallelize operation, a loop vectorize operation, a loop reversal operation, a loop interchange operation, a loop unroll operation, a loop fusion operation, and/or a loop unroll and jam operation. By applying loop transformation operations, runtime performance characteristics, such as execution speed, at the target system and/or overhead associated with a loop (e.g., loop index increment and conditional check operations) may be improved.

Referring to code portion 104A, code line 140 may compute (e.g., determine) a tiling factor based on one or more properties associated with a data cache of the target system that is to execute the matrix multiplication operation. Specifically, CacheModel may be a property that represents multiple different attributes that describe the target system. The function hostProperty may retrieve information, which describes the data cache of the target system, from the property CacheModel. For example, the information may be a single value, such as a size of the data cache or a width of a cache line of the data cache. Alternatively, the information may be a string that describes the data cache (e.g., type, manufacturer, size, etc.). The function cost_function may utilize the retrieved information to compute the tiling factor. For example, if the retrieved information is the size of the data cache (e.g., 32 KB or 64 KB), the tiling factor may be a tile size that is computed such that one tile of matrix u and one tile of matrix v together fit onto the data cache. Although the example describes the tiling factor being a tile size that is based on the size of the data cache, it is expressly contemplated that different tiling factors may be computed based on any of a variety of different attributes associated with the data cache and/or the target system, as known by those skilled in the art. The computed tiling factor may be stored in a variable named tilingFactor.

Code line 145 of the code portion 104A may include a schedule creation function 177, e.g., coder.loop.schedule( ) that, when executed, may generate a schedule object 152 named schedule. In an embodiment, the loop handling module 999 may generate the schedule object 152 based on code line 145. In addition, the loop handling module 999 may add one or more loop scheduling functions, included in code portion 104A, to the schedule object 152 based on different conditions being satisfied.

Code lines 150, 160, 165, 175, and 185 of code portion 104A may define different conditions, which, when satisfied, cause different loop scheduling functions to be added to schedule object 152. Specifically, code line 150 indicates that when a column-major memory layout is utilized, a loop scheduling interchange function 163A (e.g., schedule.interchange) is added to the schedule object 152 such that a loop interchange operation may be executed to perform an interchange of loop 125, which is the outermost loop and identified by variable name i, with loop 135, which is the innermost loop and identified by variable name k.

More specifically, coder.isColumnMajor in code line 150 may be a query function that resolves to true if, for example, input data, e.g., matrix u and/or matrix v, utilizes a column-major memory layout. With a column-major memory layout, column elements of a matrix (e.g., matrix u and matrix v) are stored contiguously in memory. Thus, it may be desirable for the computation of out[i, j] and out[i+1, j] (i.e., consecutive column output elements of the matrix multiplication operation that are computed, where i represents a row position and j represents a column position) to be temporally close such that the computations are consistent with the column-major layout in memory. Such consistency may improve data cache reuse for the matrix elements that are loaded into the data cache (avoid cache misses), thus improving efficiency. In an implementation, temporally close may also refer to the closeness in sequence of instructions, computations, computational operations, etc.

By performing a loop interchange operation, such that loop 135 identified by the variable name k is the outermost loop and loop 125 identified by the variable name i is the innermost loop, out[i, j] is computed, then output[i+1, j] is computed, then output [i+2, j] is computed, and so forth, thus improving temporal locality of the computations and improving data cache performance. Therefore, code line 155A includes a loop scheduling interchange function 163A (e.g., schedule.interchange) that may be added to the schedule object 152 to perform the loop interchange operation when a column-major memory layout is utilized, i.e., when the condition of code line 150 is satisfied.

The variable names i and k, that are identifiers for loops 125 and 135 to be interchanged, may be provided as input information for the loop scheduling interchange function 163A of code line 155A to semantically refer to loops 125 and 135. Therefore, the loop interchange operation for loops 125 and 135 can be specified utilizing the loop identifiers, e.g., variable names i and k. In an embodiment, a variable name may be indicated in the code portion 104A as an identifier for a loop based on single quotation marks surrounding the variable name (e.g., 'i', 'j', 'k'), or some other preconfigured programming construct preceding, following, or surrounding the variable name.

After the loop scheduling interchange function 163A is added to the schedule object 152 based on a column-major memory layout being utilized, the loop handling module 999 may semantically analyze the loop scheduling interchange function 163A to identify variable names i and k and determine that the variable names i and k are identifiers for loops in the unit of computation 132A. For example, the preconfigured programming construct, e.g., single quotation marks surrounding the variable names i and k, may indicate that the variable names i and k provided with the loop scheduling interchange function 163A are identifiers for loops in the unit of computation 132A.

The loop handling module 999 may utilize the identifiers, e.g., variable names i and k, to semantically identify loops 125 and 135 in the unit of computation 132A that correspond to the identifiers, e.g., variable names i and k. Specifically, and as previously explained, loops 125 and 135 in unit of computation 132A respectively start with "for i=1:row1" that utilizes variable name i and "for k=1:col1" that utilizes variable name k. As such, variable names i and k can be identified and determined as identifiers for loops 125 and 135 in the unit of computation 132A.

Therefore, the loop handling module 999 can determine that variable names i and k, which are provided with the loop scheduling interchange function 163A, are the identifiers for loops 125 and 135 to semantically identify loops 125 and 135 in the unit of computation 132A. The loop handling module 999 may then perform the loop interchange operation for the semantically identified loops 125 and 135. Thus, the loop scheduling interchange function 163A of code portion 104A can perform the semantic loop interchange operation for loops 125 and 135 in the unit of computation 132A through use and semantic identification of the variable names i and k in the unit of computation 132A and the code portion 104A.

Referring to code line 144 of code portion 104A, Coder.gpu.getGpuEnabled may be a query function that resolves to true if, for example, the target system, on which the matrix multiplication operation executes, includes a graphics processing unit (GPU) that, for example, supports parallelization. For example, IsGPU of code line 144 may be a variable that stores a value (e.g., 1 or 0) or an identifier (e.g., true or false) that indicates whether the target system includes a GPU.

Code lines 160, 165, and 175 of code portion 104A may define different conditions that determine which loop scheduling functions may be added to the schedule object 152 when the target system includes a GPU. Specifically, if the target system includes a GPU, as indicated in code line 160, a loop scheduling parallelize function (e.g., schedule.parallelize) may be added to the schedule object 152 to perform a loop parallelize operation for an outermost loop, e.g., either loop 125 or loop 135 depending on whether the loop interchange function 163A is performed, to increase the execution speed of the matrix multiplication operation on the target system. For example, different iterations of the outermost loop, e.g., either loop 125 or loop 135 depending on whether the loop interchange function 163A is performed, may be executed in parallel on different threads or processing cores of the GPU to perform the parallelization. Loop parallelization may be advantageous and improve performance when performed on an outermost loop of a unit of computation.

More specifically, and if the target system includes a GPU and if a column-major memory layout is utilized, as indicated by code lines 160 and 165, then loop 135 that is identified by the variable name k will be the outermost loop since the loop interchange operation will be performed based on code lines 150 and 155A. Code line 170A includes a loop scheduling parallelize function 166A (e.g., schedule.parallelize) that may be added to the schedule object 152 to perform a loop parallelize operation for loop 135 that is identified by the variable name k when the target system includes a GPU and a column-major memory layout is utilized. The variable name k that identifies loop 135 to be parallelized may be provided as input information (e.g., 'k') for the loop scheduling parallelize function 166A of code line 170A to semantically refer to loop 135. Therefore, the loop parallelize operation for loop 135 can be specified utilizing the loop identifier, e.g., variable name k.

After the loop scheduling parallelize function 166A is added to the schedule object 152 based on the target system including a GPU and a column-major memory layout being utilized, the loop handling module 999 may semantically analyze the loop parallelize function 166A to identify variable name k and determine that the variable name k is an identifier for a loop in the unit of computation 132A. For example, the single quotation marks surrounding the variable name k may indicate that the variable name k provided with the loop scheduling parallelize function 166A is an identifier for a loop in the unit of computation 132A.

The loop handling module 999 may utilize the identifier, e.g., variable name k, to semantically identify loop 135 in the unit of computation 132A that corresponds to the identifier, e.g., variable name k. Specifically, and as previously explained, loop 135 starts with "for k=1:col1" that utilizes a variable named k. As such, variable name k can be identified and determined as the identifier for loop 135 in unit of computation 132A.

Therefore, the loop handling module 999 can determine that variable name k, which is provided with the loop scheduling parallelize function 166A, is the identifier for loop 135 to semantically identify loop 135 in the unit of computation 132A. The loop handling module 999 may then perform the loop parallelize operation for the semantically identified loop 135. Thus, the loop scheduling parallelize function 166A of code portion 104A can perform the semantic loop parallelize operation for loop 135 in the unit of computation 132A through use and the semantic identification of variable name k in the unit of computation 132A and the code portion 104A.

Referring back to code portion 104A, if the target system includes a GPU and a column-major memory layout is not utilized (e.g., a row-major memory layout is utilized instead), as indicated by code lines 160 and 175, then loop 125 that is identified by the variable name i is the outermost loop since the loop interchange operation will not be performed. As such, loop 125 that is identified by the variable name i may be parallelized to improve execution speed on the target system. Code line 180A includes the loop scheduling parallelize function 166B that may be added to the schedule object 152 to perform the loop parallelize operation for loop 125 that is identified by the variable name i when the target system includes a GPU and a column-major memory is layout is not utilized. The variable name i that identifies loop 125 to be parallelized may be provided as input information (e.g., T) for the loop scheduling parallelize function 166B of code line 180A to semantically refer to loop 125. Therefore, the loop parallelize operation for loop 125 can be specified utilizing the loop identifier, e.g., variable name i.

After the loop scheduling parallelize function 166B is added to the schedule object 152 based on the target system including a GPU and a column-major memory layout not being utilized, the loop handling module 999 may semantically analyze the loop parallelize function 166B to identify the variable name i and determine that the variable name i is an identifier for a loop in the unit of computation 132A. For example, the single quotation marks surrounding the variable name i may indicate that the variable name i provided with the loop scheduling parallelize function 166B is an identifier for a loop in the unit of computation 132A.

The loop handling module 999 may utilize the identifier, e.g., variable name i, to semantically identify loop 125 in the unit of computation 132A that corresponds to the identifier, e.g., variable name i. Specifically, and as previously explained, loop 125 starts with "for i=1:row1" that utilizes a variable named i. As such, the variable name i can be identified and determined as the identifier for loop 125 in the unit of computation 132A.

Therefore, the loop handling module 999 can determine that variable name i, which is provided with the loop scheduling parallelize function 166B, is an identifier for loop 125 to semantically identify loop 125 in the unit of computation 132A. The loop handling module 999 may then perform the loop parallelize operation for the semantically identified loop 125. Thus, the loop scheduling parallelize function 166B of code portion 104A can perform the semantic loop parallelize operation for loop 125 in the unit of computation 132A through use and the semantic identification of variable name i in the unit of computation 132A and the code portion 104A.

If, however, the target system does not include a GPU and instead supports serial execution, as indicated by code line 185 of code portion 104A, loop tiling operations may be performed to improve data cache locality. Loop tiling may transform a loop into nested loops, with each newly created inner loop working on a smaller block of data to is improve the data cache locality. Therefore, code line 190A includes loop scheduling tiling functions 168A and 168E (e.g., schedule.tile) that may be added to the schedule object 152 to perform the loop tiling operations when the target system does not include a GPU. The variable names j and i, that are identifiers for loops 130 and 125 to be tiled, may be provided as input information (e.g., 'j' and 'i') for the loop scheduling tiling functions 168A and 168E of code line 190A to semantically refer to loops 130 and 125. Therefore, the loop tiling operations for loops 130 and 125 can be specified utilizing the loop identifiers, e.g., variable names j and i. Further, the tiling factor may be provided as input information for the loop scheduling tiling functions 168A and 168E of code line 190A.

After the loop scheduling tiling functions 168A and 168E are added to the schedule object 152, the loop handling module 999 may semantically analyze the loop scheduling tiling functions 168A and 168E to identify variable names j and i and determine that the variable names j and i are identifiers for loops in the unit of computation 132A. For example, the single quotation marks surrounding the variable names j and i may indicate that the variable names j and i provided with loop scheduling tiling functions 168A and 168E are identifiers for loops in the unit of computation 132A.

The loop handling module 999 may utilize the identifiers, e.g., variable names j and i, to semantically identify loops 130 and 125 in the unit of computation 132A that correspond to the identifiers, e.g., variable names j and i. Specifically, and as previously explained, loops 130 and 125 respectively start with "for j=1:col2" that utilizes variable name j and "for i=1:row1" that utilizes variable name i. As such, variable names j and i can be identified and determined as the identifiers for loops 130 and 125 in the unit of computation 132A.

Therefore, the loop handling module 999 can determine that variable names j and i, which are provided with the loop scheduling tiling functions 168A and 168E, are the identifiers for loops 130 and 125 to semantically identify loops 130 and 125 in the unit of computation 132A. The loop handling module may then perform the loop tiling operations for the semantically identified loops 130 and 125. Thus, the loop scheduling is tiling functions 168A and 168E of code portion 104A can perform the semantic loop tiling operations for loops 130 and 125 in the unit of computation 132A through use and the semantic identification of variable names j and i in the unit of computation 132A and the code portion 104A.

Accordingly, different criteria (e.g., attributes of the target, the input data, etc.) may determine which conditions in the code portion 104A are satisfied to determine which loop scheduling functions, that utilize identifiers to semantically identify loops and perform corresponding loop transformation operations as described above, are added to the schedule object 152.

As an example, let it be assumed that the criteria indicate that a column-major memory layout is utilized, and the target system includes a GPU. The loop handling module 999 may process the code portion 104A (e.g., from top to bottom and line-by-line) utilizing the criteria and first generate the schedule object 152 based on code line 145. The loop handling module 999 may, based on the processing of code portion 104A utilizing the criteria, add the loop scheduling interchange function 163A of code line 155A to schedule object 152 based on the column-major memory layout criterion satisfying the condition of code line 150. The loop handling module 999 may further add, based on the processing of code portion 104A utilizing the criteria, the loop scheduling parallelize function 166A of code line 170A to the schedule object 152 based on the target system including a GPU criterion satisfying the condition of code line 160 and the column-major memory layout criterion satisfying the condition of code line 165.

Therefore, and in response to the processing of code portion 104A, the schedule object 152 includes the added loop scheduling interchange function 163A with variable names i and k as input information and the loop scheduling parallelize function 166A with the variable name k as input information. As previously explained, the schedule object 152 with the added loop scheduling functions may be referred to as a "schedule" or a "generated schedule". In a similar manner as described above, the loop handling module 999 may apply the schedule to the unit of computation 132A by semantically identifying variable names i and k, semantically identifying loops 125 and 135 in the unit of computation 132A that correspond to the variable names i and k, and then performing is the loop interchange and parallelize operations for the semantically identified loops 125 and 135.

For simplicity and ease of understanding, let it be assumed as a different example, and in a similar manner as described above, that only the loop scheduling interchange function 163A is added to the schedule object 152 to generate the schedule.

Continuing with this different example and referring to FIG. 1A, Code line 195 may include an apply schedule function 161, e.g., coder.loop.apply, to apply the schedule to the unit of computation 132A where the schedule object 152 is provided as input information. In an embodiment, the apply schedule function 161 executes to semantically identify one or more loops identified by the identifiers, e.g., variable names, and then perform one or more loop transformation operations, as described above. In an embodiment, code line 195 is adjacent to (e.g., directly precedes) the unit of computation 132A such that no other program code is between code line 195 that includes the apply schedule function 161 and the unit of computation 132A.

In an embodiment, the applying performed based on the execution of the apply schedule function 161 may include first associating the schedule, e.g., loop scheduling function(s) added to the schedule object 152, with the unit of computation 132A, and then semantically identifying the loop(s) and performing the loop transformation operation(s) as described above.

Specifically, and for this different example, the loop handling module 999 may associate (e.g., tag) the unit of computation 132A with the schedule utilizing a preconfigured programming construct as depicted in FIG. 1B. The word "Tag" is utilized in FIG. 1B for illustrative purposes only, and it is expressly contemplated that any preconfigured character(s) or string of characters may be utilized to distinguish the association from other programming constructs.

After the associating, the loop handling module 999 may semantically identify loops 125 and 135 that correspond to variable names i and k, and then perform the loop interchange operation on the semantically identified loops 125 and 135 as described above. FIG. 1C depicts a transformed unit of computation 196 that may be generated based on semantically identifying loops 125 and 135 and performing the loop interchange operation, such that loop 135 identified by the variable name k is the outermost loop and loop 125 identified by the variable name i is the inner most loop. It is expressly contemplated that the transformed unit of computation 196 may be human readable or not human readable, e.g., in intermediate representation (IR) form only.

In an embodiment, deployment code (e.g., C or C++ code) for the target system may be generated from the program code 101A that includes the unit of computation 132A, where the generated deployment code reflects the transformation(s) of the unit of computation 132A. The deployment code may then be deployed on the target system to execute the computation (e.g., matrix multiplication operation).

Although reference is made to the loop handling module 999 processing code portion 104A to add loop scheduling functions to the schedule object 152, and then applying the schedule to the unit of computation 132A based on code line 195, it is expressly contemplated that the loop handling module 999 may perform all or some of the steps together as one process or may perform the steps individually. For example, the loop handling module 999 may, as a single process and based on code line 195, process the code portion 104A to add loop scheduling functions to the schedule object 152, and then associate the schedule object 152 with the unit of computation 132A and transform the unit of computation 132A to generate the transformed unit of computation 196. As such, the description regarding the order of the steps performed by the loop handling module 999 should be taken as illustrative only. Further, it should be understood that the boxes around particular portions of code in FIG. 1A, e.g., boxes around textual program code 102A, unit of computation 132A, and code portion 104A, are included for explanatory purposes only, and are not part of the program code 101A.

In addition, although the unit of computation 132A of FIG. 1A includes for loops, it is expressly contemplated that the one or more embodiments described herein may be utilized with units of computation that include other control flow operations, such as, but not limited to, while loops, do-while loops, repeat-until loops, if-else operations, switch operations, branching operations, etc. Further, although FIG. 1A illustrates the use of particular loop scheduling functions, it is expressly contemplated that other control flow scheduling functions or other control flow scheduling programming constructs may be utilized in a schedule, e.g., code portion 104A, to perform one or more control flow transformation operations according to the one or more embodiments described herein.

FIG. 2 is example program code that includes a code portion that utilizes syntactical patterns (e.g., labels, quoted strings, statements, or other language constructs), which identify loops of a unit of computation, to perform loop transformation operations according to one or more embodiments described herein. Program code 101B may include one or more lines of code that may be provided as input to a computing device from a user utilizing, for example, an input device, such as a keyboard, of the computing device. Alternatively, program code 101B may be predefined and provided, at least in part, from an external source, to the computing device.

The configuration of program code 101B may be similar to that of program code 101A. However, labels are utilized as identifiers for loops in unit of computation 132B, instead of variable names which are utilized as identifiers for the loops in the unit of computation 132A in FIG. 1A. As depicted in FIG. 2, a unique label is provided for each loop, e.g., 125, 130, and 135, in the unit of computation 132B to identify each loop with a label. For example, a user (e.g., author of textual program code 102B) may insert a label within each loop of the unit of computation 132B to identify the loop with the inserted label. Specifically, a label function, e.g., coder.loop.label, may be utilized to associate a label with a loop, where the label is provided as input information to the label function. Based on the association, the label can be utilized to semantically refer to and identify the loop.

In the example of FIG. 2, code line 121 is provided within loop 125 (e.g., nested within the loop 125) to identify loop 125 with label Loop1, where Loop1 is provided as input information to the label function 169A. Similarly, code line 123 is provided within loop 130 to identify loop 130 with label Loop2, where Loop2 is provided as input information to the label function 169B. In addition, code line 124 is provided within the loop 135 to identify loop 135 with label Loop3, where Loop3 is provided as input information to the label function 169C. In an embodiment, a label may be indicated in the label function of the unit of computation 132B based on single quotation marks surrounding the label (e.g., 'Loop1', 'Loop2', 'Loop3'), or some other preconfigured programming construct preceding, following, or surrounding the label.

In an embodiment, program code, e.g., code lines 121, 123, and 124, utilized to identify a loop with a label may directly or immediately follow a loop statement, e.g., "for i=1:row1", for a loop, e.g., loop 125, as depicted in FIG. 2. When the loop handling module 999 semantically analyzes code lines 121, 123, and 124 of the textual program code 101B, the loop handling module 999 may identify the labels (e.g., Loop1, Loop2, and Loop3) in the label functions (e.g., 169A, 169B, and 169C), and determine that loops 125, 130, and 135 are to be identified by labels Loop1, Loop2, and Loop3, respectively, such that the labels may be utilized to semantically refer to and identify the loops.

The labels that identify the loops may be utilized in code portion 104B. Specifically, the labels (e.g., 'Loop1', 'Loop2', and 'Loop3') may be utilized as input information for the loop scheduling functions, as depicted in code lines 155B, 170B, 180B, and 190B, to perform loop transformation operations. In an embodiment, single quotation marks surrounding the labels (e.g., 'Loop1', 'Loop2', 'Loop3'), or some other preconfigured programming construct preceding, following, or surrounding the labels, may indicate that the labels provided with the loop scheduling functions are identifiers for loops in the unit of computation 132B.

The loop handling module 999 may, based on a processing of code portion 104B, add one or more loop scheduling functions to schedule object 152 based on different conditions being satisfied in a similar manner as described above with reference to FIGS. 1A-1C. The loop handling module 999 may semantically analyze the added loop scheduling functions to identify the labels in the added loop scheduling functions in a similar manner as described above with reference to FIGS. 1A-1C.

The loop handling module 999 may utilize the identified labels (e.g., Loop1, Loop2, and Loop3) to semantically identify loops 125, 130, and 135 in the unit of computation 132B that correspond to the labels in a similar manner as described above with reference to FIGS. 1A-1C. Specifically, and because the label functions 169A-C are provided in unit of computation 132B, the loop handling module 999 can determine that labels Loop1, Loop2, and Loop3 identify loops 125, 130, and 135, respectively. The is loop handling module 999 may perform loop transformation operations on the semantically identified loops in a similar manner as described above with reference to FIGS. 1A-1C. Deployment code (e.g., C or C++ code) for a target system may be generated in a similar manner as described above with reference to FIGS. 1A-1C.

Although the above describes utilizing a label function, e.g., coder.loop.label, to identify a loop with a label, it is expressly contemplated that a loop may be identified with a label in a variety of different ways. Specifically, a label name may be inserted next to, before, or after an explicit loop statement to identify the loop with the label. For example, and to identify loop 125 with label Loop1, the label may be surrounded by a preconfigured programming construct, e.g., single quotation marks, and positioned next to the explicit loop statement (e.g., "for i=1:row1 'Loop'"). Accordingly, the manner in which a loop may be identified with a label as described herein should be taken as illustrative only. In addition, although the above describes utilizing labels, it is expressly contemplated that other syntactical patterns, e.g., quoted strings, statements, or other language constructs, may be used as identifiers for loops in the unit of computation 132B in a similar manner as described above.

FIG. 3 is example program code that includes a code portion that utilizes another syntactical pattern (e.g., text strings), which identify loops of a unit of computation, to perform loop transformation operations according to one or more embodiments described herein. Program code 101D may include one or more lines of code that may be provided as input to a computing device from a user utilizing, for example, an input device, such as a keyboard, of the computing device. Alternatively, program code 101D may be predefined and provided, at least in part, from an external source, to the computing device.

The configuration of program code 101D may be similar to that of program code 101A and 101B. However, text strings are utilized as identifiers for loops in unit of computation 132D, instead of variable names and labels. As depicted in FIG. 3, a text string is provided for each loop, e.g., 125, 130, and 135, in the unit of computation 132D to identify each loop with a text string. Specifically, a user may provide a comment line, e.g., designated by % in the example of FIG. 3, which includes a prefix string, e.g., 'REF', is that is followed by a text string that identifies a loop.

In an embodiment, the comment that includes the prefix string and text string may be adjacent to (e.g., next to) an explicit loop statement for a loop. In the example of FIG. 3, comment line 183 is provided adjacent to explicit loop statement "for i=1:row1" for loop 125 to identify loop 125 with text string Loop11, where text string Loop11 follows the prefix string 173A. Similarly, comment line 184 is provided adjacent to explicit loop statement "for j=1:col2" for loop 130 to identify loop 130 with text string Loop22, where text string Loop22 follows the prefix string 173B. In addition, comment line 186 is provided adjacent to explicit loop statement "for k=1:col1" for loop 135 to identify loop 135 with text string Loop33, where text string Loop33 follows the prefix string 173C. When the loop handling module 999 semantically analyzes comment lines 183, 184, and 185 of textual program code 102E, the loop handling module 999 may differentiate comments 183, 184, and 185, which are utilized to identify loops with text strings, from other comments based on the prefix strings 173A, 173B, and 173C. In addition and based on the semantic analysis, the loop handling module 999 may identify text strings Loop11, Loop22, and Loop33 in comment lines 183, 184, and 185, and determine that loops 125, 130, and 135 are to be identified by text strings Loop11, Loop22, and Loop33, respectively, such that the text strings may be utilized to semantically refer to and identify the loops 125, 130, and 135.

The text strings that identify the loops in the unit of computation 132D may be utilized in code portion 104H. Specifically, the text strings (e.g., 'Loop11', 'Loop22', and 'Loop33') may be utilized as input information for the loop scheduling functions, as depicted in code lines 155Q, 170Q, 180Q, and 190Q, to perform the loop transformation operations. In an embodiment, single quotation marks surrounding the text strings (e.g., 'Loop11', 'Loop22', 'Loop33'), or some other preconfigured programming construct preceding, following, or surrounding the text strings, may indicate that the text strings provided with the loop scheduling functions are identifiers for loops in the unit of computation 132D.

The loop handling module 999 may, based on a processing of code portion 104H, add one or more loop scheduling functions to schedule object 152 based on different is conditions being satisfied in a similar manner as described above with reference to FIGS. 1A-2. The loop handling module 999 may semantically analyze the added loop scheduling functions to identify the text strings in the added loop scheduling functions as described above with reference to FIGS. 1A-2.

The loop handling module 999 may utilize the identified text strings (e.g., Loop11, Loop22, Loop33) to semantically identify loops 125, 130, and 135 in the unit of computation 132D that correspond to the text strings in a similar manner as described above with reference to FIGS. 1A-2. Specifically, and because the comment lines 183, 184, and 186 are provided in unit of computation 132D, the loop handling module 999 can determine that text strings Loop11, Loop22, and Loop33 identify loops 125, 130, and 135, respectively. The loop handling module 999 may perform the loop transformation operations on the semantically identified loops in a similar manner as described above with reference to FIGS. 1A-2. Deployment code (e.g., C or C++ code) for a target system may be generated in a similar manner as described above with reference to FIGS. 1A 2.

FIG. 4 is example program code that includes a code portion that utilizes another syntactical pattern (e.g. a variable name), derived based on an execution of a loop function and that identifies a loop, to perform a loop transformation operation according to one or more embodiments described herein. Program code 101C may include one or more lines of code that may be provided as input to a computing device by a user utilizing, for example, an input device, such as a keyboard, of the computing device. Alternatively, program code 101C may be predefined and provided, at least in part, from an external source, to the computing device.

The configuration of program code 101C may be similar to that of program codes 101A, 101B, and 101D. However, in code portion 104C, a variable name jj is derived based on an execution of loop scheduling tiling function 168D, of code line 190C, that is added to the schedule object 152 when the target system does not include a GPU. As explained above, loop tiling may transform a loop into nested loops, with each newly created inner loop working on a smaller block of data to improve the cache locality. Because j and TilingFactor are provided as input information for loop scheduling tiling function 168D of code line 190C, the loop tiling operation can be performed for loop 130 that is identified by the variable name j utilizing the tiling factor. In this example, the variable name jj is also provided as input information to the loop scheduling tiling function 168D of code line 190C. Because the variable name jj is provided as input information to the loop scheduling tiling function 168D, the newly created loop (e.g., inner loop) of the nested loops can be semantically referred to and identified by the variable name jj Specifically, and when the target system does not include a GPU, the loop handling module 999 adds the loop schedule tiling function 168D (with input information j, TilingFactor, and jj) to schedule object 152. The loop handling module 999 also adds the loop scheduling parallelize function 168H (with input information jj) of code line 190C to the schedule object 152. The loop handling module 999 may semantically analyze loop scheduling tiling function 168D that creates the new inner loop that works on the smaller block of data and determine that because the variable name jj is provided as input information to loop scheduling function 168D, the newly created inner loop that works on the smaller block of data is to be identified by variable name jj.

Thus, the newly derived variable name jj that identifies the newly created inner loop may be utilized in the code portion 104C to, for example, perform an additional loop transformation operation. In this example of FIG. 4, the variable name jj, that identifies the newly created loop, is provided as input information (e.g., 'jj') to loop scheduling parallelize function 168H that is also added to the schedule object 152.

Therefore, The loop handling module 999 may perform the loop tiling operation for semantically identified loop 130 that is identified by variable name j and perform the loop parallelize operation for the semantically identified newly created loop that is identified by variable name jj as described above with reference to FIGS. 1A-3. Deployment code (e.g., C or C++ code) for a target system may be generated in a similar manner as described above with reference to FIGS. 1A-3.

Although the above with respect to FIG. 4 describes identifying a newly created loop with a derived variable name, it is expressly contemplated that newly created loops may be identified with other derived identifiers (e.g., syntactical patterns such as, but not limited to, labels, quoted strings, text strings, statements, or other language constructs) in a similar manner as described above.

FIG. 5 is example program code that includes a code portion that utilizes variable names, which identify implicit loops of a unit of computation, to perform loop transformation operations according to one or more embodiments described herein. Program code 101E may include one or more lines of code that may be provided as input to a computing device by a user utilizing, for example, an input device, such as a keyboard, of the computing device. Alternatively, program code 101E may be predefined and provided, at least in part, from an external source, to the computing device.

Program code 101E may include code line 105B that may be a header for a function named MatrixAdd that may be utilized to execute a matrix addition operation on a target system. The inputs (e.g., u and v) to the function named MatrixAdd may be the same as described above with respect to code line 105A of FIG. 1A. MatrixAdd may also include output variable out, which may store an output of the execution of the matrix addition operation.

Since a matrix addition operation, which is an element wise-operation, requires that the dimensions of each matrix be the same (e.g., two dimensions), code line 133 of the textual program code 102C asserts that the dimensions of matrix u and v are the same. As seen in unit of computation 132C, the matrix addition operation is represented with the input variables (e.g., u and v) and an operator (e.g., +). That is, there are no explicit loop statements, e.g., "for i=1:row1", in the unit of computation 132C for the matrix addition operation even though loops may be utilized to perform the matrix addition operation. The loops utilized for the matrix addition operation, without corresponding explicit loop statements in the unit of computation 132C, may be referred to as "implicit loops" according to the one or more embodiments described herein.

For example, an outer implicit loop (for loop) may be utilized to iterate row positions for the matrix addition operation, and an inner implicit loop (for loop) may be utilized to iterate column positions for the matrix addition operation. Alternatively, a single implicit loop (for loop) may be utilized to iterate row and column positions for the matrix addition operation. In the example of FIG. 5, let it be assumed that two implicit loops, e.g., an outer implicit loop and an inner implicit loop, are utilized to perform the matrix addition operation.

According to the one or more embodiments described herein, and as will be described in further detail below, the implicit loops may be identified by identifiers, e.g., variable names, to semantically refer to and identify the implicit loops such that one or more loop transformation operations can be performed for the implicit loops.

Code line 134 of code portion 104D may set a variable named loopLevelCount to a number of dimensions of matrix v. In this example, matrix u and matrix v are two dimensional matrices. As such, the variable named loopLevelCount stores a value of 2. In addition, code line 136 of code portion 104D may include a loop name association function 137, e.g., schedule.associateLoopLevelsWithNames, which may be utilized to identify the two implicit loops that are utilized for the matrix addition operation with identifiers, e.g., variable names. Specifically, input information to the loop name association function 137 of code line 136 may be utilized by, for example, a user, to identify the two implicit loops of the matrix addition operation with variable names. Specifically, a value, e.g., 0, may be provided as input to the loop name association function 137 to associate the outer implicit loop for the matrix addition operation with a variable name. The value representing the outer implicit loop may be followed by an identifier, e.g., variable name 'i', which is used to identify the outer implicit loop. LoopLevelCount-1 may also be provided as input to the loop name association function 137 to associate an innermost loop for the matrix addition operation with a variable name. Because LoopLevelCount stores a value of 2, LoopLevelCount-1 is equal to a value of 1. This value, e.g., 1, may represent the inner implicit loop for the matrix addition operation. The value representing the inner implicit loop may be followed by an identifier, e.g., variable name 'j', which is used identify the inner implicit loop.

When the loop handling module 999 processes code portion 104D utilizing, for example, different criteria, the loop handling module 999 may add the loop name association function 137 to the schedule object 152. The loop handling module 999 may also add one or more loop scheduling functions of code portion 104D to the schedule object 152 based on different conditions being satisfied based on the criteria, as described above.

As such, and when the schedule, e.g., schedule object 152 with the added functions, is applied to the unit of computation 132C, the loop handling module 999 may identify the outer implicit loop with variable name i and may identify the inner implicit loop with variable name j based on the execution of the loop name association function 137 that is added to the schedule object 152. The loop handling module may then semantically analyze the added loop scheduling functions to identify the variable names, and then semantically identify the outer and inner implicit loops that correspond to the variable names in a similar manner as described above with reference to FIGS. 1A-4.

The loop handling module 999 may perform loop transformation operations on the semantically identified implicit loops in a similar manner as described above with reference to FIGS. 1A-4. Deployment code (e.g., C or C++ code) for the target system may be generated in a similar manner as described above with reference to FIGS. 1A-4.

Although the above with respect to FIG. 5 describes identifying implicit loops with variable names, it is expressly contemplated that implicit loops may be identified with other identifiers (e.g., syntactical patterns such as, but not limited to, labels, quoted strings, text strings, statements, or other language constructs) in a similar manner as described above.

FIGS. 6A and 6B are respectively a unit of computation and a code portion that can be stored in different files, locations (e.g., arbitrary or independent locations in the same file), modules, other structural elements of a program, or stored at the same or different storage devices, where the code portion utilizes variable names, which identify loops of the unit of computation, to perform loop transformation operations according to one or more embodiments described herein.

Specifically, file 500 of FIG. 6A includes program code with code line 105A and textual program code 102D that includes unit of computation 132A, while file 600 of FIG. 6B includes different program code with code line 177 and code portion 104E. Therefore, and in the example of FIGS. 6A and 6B, the unit of computation 132A and code portion 104E are part of different programs that are stored in different and separate files.

File 500 of FIG. 6A includes code line 171. When the loop handling module 999 analyzes code line 171, the loop handling module 999 may process file 600 of FIG. 6B, as described in further detail below, based on a function name of code line 171, e.g., generateSchedule, corresponding to the name and/or header of file 600 of FIG. 6B (e.g., code line 197 of file 600 is a header with generateSchedule).

With reference to FIG. 6B, code line 197 of file 600 may be the header for a function named generateSchedule that may generate and return a schedule object 152 as output. The loop handling module 999 may process file 600 and generate schedule object 152 that is an output of file 600 as indicated in code line 197. The schedule object 152 output from file 600 may then be stored in schedule object 152 of code line 171 of file 500 of FIG. 6A.

As an example and with reference to FIG. 6B, let it be assumed that criteria indicate that a column-major memory layout is utilized, and the target system includes a GPU. When the loop handling module 999 processes file 600 of FIG. 6B, the loop handling module 999 may generate, from file 600 of FIG. 6B, schedule object 152 and add to the schedule object: (1) the loop scheduling interchange function 163A of code line 155A based on the column major memory layout criterion satisfying the condition of code line 150, and (2) the loop scheduling parallelize function 166A of code line 170A based on the target system including a GPU criterion satisfying the condition of code lines 160 and 165. The generated schedule object with the added loop scheduling functions may be output from file 600 and stored in schedule object 152 of code line 171 of file 500 of FIG. 6A.

The loop handling module 999 may semantically analyze the loop scheduling interchange function 163A and the loop scheduling parallelize function 166A, stored in schedule object 152 of file 500, to identify variable names i and k in a similar manner as described above with reference to FIGS. 1A-5. The loop handling module 999 may semantically identify loops 125 and 135 that correspond to variable names i and k, and perform the loop interchange operation and loop parallelize operation on the semantically identified loops 125 and 135 in a similar manner as described above with reference to FIGS. 1A-5. Deployment code (e.g., C or C++ code) for a target system may be generated in a similar manner as described above with reference to FIGS. 1A-5.

Therefore, and because of the use and semantic identification of the identifiers, the loop transformation operations may be performed even when the code portion 104E and unit of computation 132A are stored in different files, locations (e.g., arbitrary or independent locations in the same file), modules, other structural elements of a program, or stored at the same or different storage devices.

Although the above, with respect to FIGS. 6A and 6B, describes utilizing variable names that identify loops with code portion 104E and unit of computation 132A, it is expressly contemplated that other identifiers (e.g., syntactical patterns such as, but not limited to, labels, quoted strings, text strings, statements, or other language constructs) may be utilized to identify loops with code portions and units of computation that are stored in different files, locations (e.g., arbitrary or independent locations in the same file), modules, other structural elements of a program, or stored at the same or different storage devices, in a similar manner as described above.

FIG. 7A is an example in which program code and a code portion are provided to a code generation process, and during the process, loop transformation operations are performed according to one or more embodiments described herein.

Program code 700 of FIG. 7A may include code line 702 for a code generation process. Program code 800 of FIG. 7B may include code portion 104F, while program code 900 of FIG. 7C may include textual program code 102A that includes unit of computation 132A.

With reference to FIG. 7A, program code 700 includes code line 701. Code line 701 may be utilized to generate a schedule object for a data cache that is 64 KB in size. Specifically, and when the loop handling module 999 analyzes code line 701, the loop handling module 999 may process program code 800 based on a function name of code line 701, e.g., generateScheduleForGivenCacheSize, corresponding to the name and/or is header of program code 800.

The loop handling module 999 may utilize 64, which is provided input information at code line 701, to process code portion 104F of program code 800. Based on the processing, and in a similar manner as described above, the loop handling module 999 may add loop scheduling tiling functions 168A and 168E to the schedule object 152, where input information to the tiling functions are a tiling factor and variable names j and i that identify loops 125 and 130 of unit of computation 102A of program code 900 of FIG. 7C. The tiling factor may be calculated based on code line 810 that ensures that three tiles, e.g., one for each of two input matrices and one for the output matrix, fit on one of a cache line of a 64 KB size cache. The schedule object 152 with the added loop scheduling tiling functions 168A and 168E may be an output of program code 800 as indicated in code line 805 and stored in scheduleForLargeCache of code line 701 of program code 700.

Referring back to FIG. 7A, code line 702 may execute to perform the code generation process to generate deployment code (e.g., C or C++ code) from textual program 102A, of program code 900, for a target system. According to the one or more embodiments described herein, during the code generation process, the loop handling module 999 may apply the schedule (e.g., schedule object 152 with the added loop tiling functions and stored in variable name scheduleForLargeCache) to the unit of computation 102A of program code 900, and then generate deployment code (e.g., C or C++ code). Specifically, and as will be described in further detail below, the loop handling module 999 may, during the code generation process, semantically identify loops corresponding to variable names j and i, and then perform the loop scheduling tiling functions on the semantically identified loops.

Referring to FIG. 7A, the schedule object 152, with the added loop tiling functions 168A and 168E and stored in variable scheduleForLargeCache, may be provided as input information to code line 702 for the code generation process. Program 900 may also be provided as input information to code line 702 for the code generation process (e.g., MatrixMultiplyWithScheduleAsInput.m of code line 702 corresponds to the function name in header of program code 900). Further, two 512×512 matrices of random is numbers may be provided as input information to code line 702 for the code generation process. The function coder.constant of code line 702 may be utilized with schedule object 152 stored in the variable named scheduleForLargeCache since the schedule object 152 will remain constant during the code generation process.

During the code generation process and based on the execution of code line 702, the loop handling module 999 may semantically identify the loops and perform loop transformation operations according to the one or more embodiments described herein. Specifically, and during the code generation process, the loop handling module 999 may semantically analyze the loop tiling functions 168A and 168E to identify the identifiers, e.g., variable names j and i, and then semantically identify loops 130 and 125 in unit of computation 132A that correspond to the identifiers, e.g., variable names j and i, in a similar manner as described above. The loop handling module may then, during the code generation process, perform the loop tiling operations for the semantically identified loops 130 and 125 as described above.

Therefore, the loop scheduling tiling functions of code portion 104F can perform the semantic loop tiling operations for loops 130 and 125 during the code generation process through use and the semantic identification of variable names j and i in unit of computation 132A and code portion 104F. Deployment code (e.g., C or C++ code) for the target system may then be generated during the code generation process as described above, where the deployment code reflects the transformations based on the performance of the loop tiling functions. The generated deployment code may be stored in folder GeneratedCodeFolderForLargeCache, as indicated in code line 702.

Although the above with respect to FIGS. 7A-7C describes the use of variable names as identifiers to semantically identify loops and perform loop transformation operations during the code generation process, it is expressly contemplated that other identifiers (e.g., syntactical patterns such as, but not limited to labels, quoted strings, statements, text strings, or other language constructs) may be used to semantically identify loops and perform loop transformation operations during the code generation process in a similar manner as described above.

Advantageously, an author of the textual program code, who may be familiar with the identifiers utilized in the unit of computation, can create a code portion in a user intuitive manner by referring to the unit of computation or parts of the unit of computation (e.g., loops) with the identifiers, e.g., variable names, syntactical patterns, etc., in the code portion.

In addition, and because of the use of the identifiers to semantically identify the loops as described above, the code portion and the unit of computation, both of which may be created in an imperative or procedural programming language, may be separate, distinct, and located at independent locations from each other. Thus, and because of the use of the identifiers, the code portion with one or more loop scheduling functions is not required to be at a particular location with respect to unit of computation such that loop transformation operations can be performed on the textual program code, e.g., the loops of unit of computation.

Specifically, and in an embodiment, a code portion may be in any location in program code. For example, although FIG. 1A depicts the code portion 104A preceding the textual program code 102A, it is expressly contemplated that the code portion 104A may be in the textual program code 102A and before code line 195 (e.g., between code line 126 and code line 195), in the textual program code 102A and after the unit of computation 132A, etc. In an implementation, the code portion and the unit of computation may be in different files, locations (e.g., arbitrary or independent locations in the same file), modules, other structural elements of a program, or stored at the same or different storage devices.

In an embodiment, and when the code portion and the unit of computation are syntactically located within a same function, class, file, or module in the program code, the code portion may be anywhere in the program code as long as the code portion precedes the unit of computation 132A.

Because the code portion that utilizes the identifiers to semantically refer to and identify the loops can be separated from and independent of the unit of computation according to one or more embodiments described herein, a user can more easily update the code portion and/or the unit of computation when compared to some conventional methods and systems. Specifically, the user does not have to, for example, differentiate is scheduling code lines from interwoven unit of computation code lines to update scheduling code and/or unit of computation code (i.e., algorithmic code), which may be required by some conventional methods and systems. In addition, and because of the separation, the one or more embodiments described herein allow for easier portability, when compared to some conventional methods and systems, of the unit of computation with different code portions, e.g., schedules. Furthermore, and because of the separation, different code portions, e.g., schedules, can be utilized with different target systems without needing to modify the unit of computation.

In addition, because the code portion and the unit of computation use identifiers to generate deployment code that may increase execution speed on the target system and/or provide other advantages for the target system that executes the deployment code, the one or more embodiments described herein provide an improvement to a computer itself, e.g., target system.

In addition to, or alternative to, using identifiers to perform code transformations, e.g., loop transformations, in code compilation, code execution, or code generation, the identifiers for textual program sections, for example, implicit or explicit loops in a unit of computation can also be used to generate reports about the program sections, generate profiling information about the program sections, deploying (including replacing or placing) a unit of computation in a heterogeneous architecture of a device, and/or indicating a relationship between loops.

FIG. 8 is an example program code with a corresponding report generated for units of computation utilizing variable names that identify loops according to one or more embodiments described herein. Program code 1000 may include unit of computation 132A and unit of computation 955 that may both perform a matrix multiplication operation as described above with reference to FIG. 1A. As described above, unit of computation 132A may include loops 125, 130, and 135 that are identified by variable names i, j, and k, respectively. Similarly, unit of computation 955 includes loops 922, 923, and 924 that may be identified by variable names x, y, and z, respectively.

The loop handling module 999 may determine that one or more loops of the unit of computation 132A are fusible with one or more loops of the unit of computation 955. Loop fusion may be a loop transformation operation that replaces multiple loops with a single loop. In an embodiment, loop fusion may be possible when two loops iterate over the same range but do not reference each other's data such that there are no dependencies among the loops.

In the example of FIG. 8, the loop handling module 999 may determine that loop 125 that is identified by variable name i is fusible with loop 922 that is identified by variable name x because loops 125 and 922 both iterate from 1 to the value stored in the variable named row1.

Because of the semantic identification of variable names i and x and thus the determination that they are identifiers for loops 125 and 922 in a similar manner as described above, the loop handling module 999 may generate report 1005, e.g., a pop-up message, that indicates that the identifiers of loops 125 and 922, e.g., variable names i and x, are fusible. Specifically, and in this example, report 1055 may indicate that "Loop T fusible with Loop 'x'". The report 1005 may be generated for display on a display screen of a computing device.

The information in the generated report 1005 may then be utilized by a user to, for example, change the program code 1000 by, for example, fusing loops 125 and 922. In addition or alternatively, a user may create a code portion (not shown), e.g., scheduling code, that includes a loop scheduling fusion function that executes and performs a loop fusion operation utilizing variable names i and k to semantically refer to loops 125 and 922, according to one or more embodiments described herein. Alternatively, and based on user input indicating that the loops are to be fused (e.g., a point device used to make a selection based on the generated report 1005), the loop handling module 999 may automatically perform the loop fusion operation for loops 125 and 992 according to one or more embodiments described herein. For example, the loop handling module 999 may, based on the user input, automatically generate deployment code that reflects the fusion of loops 125 and 922 and/or automatically generate a transformed unit of computation where loops 125 and 922 are fused.

Although the above with respect to FIG. 8 describes generating a report utilizing variable names that identify loops, it is expressly contemplated that the one or more embodiments described herein may generate a report utilizing other identifiers (e.g., syntactical patterns such as, but not limited to, labels, quoted strings, statements, text strings, or other language constructs) that identify loops in a similar manner as described above.

FIGS. 9A and 9B are respectively program code and corresponding profiling information that may be generated for a unit of computation utilizing a variable name that identifies a loop according to one or more embodiments described herein. Program code 1105 may include code line 1112 that may be a header for a function named MatrixMultiplyForProfile. The function MatrixMultiplyForProfile may have any of a variety of different inputs, signified here with ellipses (" . . . "), which in this example may be irrelevant. In addition, the function MatrixMultiplyForProfile includes a variable named out for a matrix multiplication operation.

Program code 1105 may include unit of computation 132A that performs the matrix multiplication operation, and includes loops 125, 130, and 135 that are identified by variable names i, j, and k, respectively, as described above.

The loop handling module may analyze code portion 104Y and add a loop profiling function 1113A, e.g., schedule.profile, of code line 1110A to schedule object 152, where the loop profiling function 1113A may execute to generate profiling information for a loop of the unit of computation 132A. The loop handling module 999 may semantically analyze the added loop profiling function 1113A to identify the variable name i, and then semantically identify loop 125 that corresponds to variable name i, in a similar manner as described above.

Because of the semantic identification of variable name i and thus the determination that it is an identifier for loop 125 in a similar manner as described above, the loop handling module 999 may, during compilation, code generation, and/or translation, for example, add profiling instrumentation instructions (as described below) to the unit of computation 132A. Therefore, when the program is executed, simulated, or interpreted on a target system, profiling information 1116A (FIG. 9B) can be generated, based on the inserted profiling instrumentation instructions, for semantically identified loop 125 that corresponds to variable name i. In an embodiment, and in response to the determination that variable name i is the identifier for loop 125, the loop handing module 999 may insert one or more instructions (not shown), such as profiling instrumentation instructions, into the unit of computation 132A. For example, the one or more instructions may be placed at a location nested within loop 125 of unit of computation 132A since loop 125 is identified by variable name i. The insertion of the instructions into the unit of computation 132A where the instructions do not directly affect the operation implemented by the unit of computation 132A (matrix multiplication operation), but instead determine/record some execution characteristics (e.g., execution timing information, memory consumption, etc.) associated with the unit of computation 132A may be referred to as instrumenting the unit of computation 132A.

In an implementation, the one or more instructions may utilize a clock (e.g., a clock of the computing device), a counter, and/or other hardware/software components to generate the profiling information, e.g., timing or other useful information associated with execution of the unit of computation 132A on the target system. For example, the instructions may utilize a clock of a computing device to generate timing information for the execution of loop 125 and/or for the execution of the parts of loop 125. Additionally, other useful information may include, but is not limited to, logging of memory allocation in a loop, power consumption of the target system while a loop is executing, a number and cost of inter-thread communication requests, or a number of cache misses that a body of a loop generated.

The profiling information 1116A for loop 125 that is identified by variable name i may be displayed, for example, on a display device of a computing device. For example, and with reference to FIG. 9B, the loop handling module 999 may generate profiling information 1116A for each program statement associated with loop 125, as indicated in column 1118. In addition, a line number for each program statement may be included in column 1119.

In an embodiment, the profiling information may include, but is not limited to, a number of times a program statement is called during execution of unit of computation 132A as indicated in column 1114 titled "Calls", a total amount of time it takes for a is program statement to execute during execution of the unit of computation 132A in column 1115 titled "Total Time(s)", and/or a percentage value indicating the percentage of time the program statement takes to execute with relation to an overall time it takes for unit of computation 132A to execute in column 1117 titled "% Time". The values provided in profiling information 1116A are for illustrative purposes only, and it is expressly contemplated that different values and or profiling information may be generated and displayed according to the one or more embodiments described herein.

A user may utilize the profiling information 1116A to determine, for example, which program statements in the unit of computation 132A take longest to execute (in this example code line 14 that computes the dot product) to then optimize the program code 1105 for better performance by, for example, modifying the program code 1105 and/or generating a code portion (not shown) that may be utilized to perform one or more loop transformation operations (e.g., loop fusion, loop interchange, etc.), as described above.

FIGS. 9C and 9D are respectively program code and corresponding profiling information that may be generated to provide a comparison of a unit of computation before and after performing a loop transformation operation according to one or more embodiments described herein. Program code 1130 of FIG. 9C may include code line 1120 that may be a header for a function named MatrixMultiplyForProfileTransform. The function MatrixMultiplyForProfileTransform may have an input variable c and any of a variety of different inputs signified here with ellipses (" . . . "), which in this example may be irrelevant. Input variable c may store a value of 0 representing "false" or a value of 1 representing "true". In addition, the function MatrixMultiplyForProfileTransform includes a variable named out for a matrix multiplication operation.

Program code 1130 may include unit of computation 132A that performs the matrix multiplication operation, and includes loops 125, 130, and 135 that are identified by variable names i, j, and k, respectively, as described above.

Let it be assumed that for code generation for program code 1130, c stores a compile-time constant value of 0 that represents "false". For the code generation, the loop interchange operation of code line 155A is not performed since the condition of is code line 1150 is not satisfied. As such, loop 125 remains the outermost loop and loop 135 remains the innermost loop. The loop handling module 999 may generate the profiling information, in a similar manner as described above with reference to FIGS. 9A and 9B, when the loop interchange operation is not performed. Specifically, loop handling module 999 may generate profiling information (e.g., column 1121 of FIG. 9B titled "Without Loop Transformation Operation") for semantically identified loop 125 that is the outermost loop and for semantically identified loop 135 that is the innermost loop.

Let it be assumed that for a different code generation of program code 1130, c stores a compile-time constant value of 1 that represents "true". For the different code generation, the loop interchange operation of code line 155A is performed since the condition of code line 1150 is satisfied. As such, loop 135 becomes the outermost loop and loop 125 becomes the innermost loop. The loop handling module 999 may generate the profiling information, in a similar manner as described above with reference to FIGS. 9A and 9B, when the loop interchange operation is performed. Specifically, loop handling module 999 may generate profiling information (e.g., column 1122 of FIG. 9B titled "With Loop Interchange Operation") for semantically identified loop 135 that is the outermost loop and for semantically identified loop 125 that is the innermost loop.

FIG. 9D is example profiling information that may be generated to provide a comparison of a unit of computation before and after performing a loop transformation operation according to one or more embodiments described herein. Specifically, the loop handling module 999 may generate profiling information 116B that includes both (1) the profiling information generated for the unit of computation 132A when the loop interchange operation of code line 155A is not performed, and (2) the profiling information generated for the unit of computation 132A when the loop interchange operation of code line 155A is performed.

The profiling information 1116B may be generated to indicate the gain/loss in performance, e.g., when execution time is chosen (user selection) as the unit of performance measurement, to the unit of computation 132A based on whether the loop interchange operation is performed or not. Specifically, column 1121 titled "Without is Loop Transformation Operation" includes profiling information generated when the loop interchange operation is not performed (i.e., before the loop interchange operation is performed) for the unit of computation 132A. Column 1122 titled "With Loop Interchange Operation" includes profiling information generated when the loop interchange operation is performed (i.e., after the loop interchange operation is performed) for the unit of computation 132A.

As illustrated in FIG. 9D, it takes the unit of computation 132A a total time of 15.471 seconds to execute when the loop interchange operation is not performed. Additionally, it takes the unit of computation 132A a total time of 5.523 seconds to execute when the loop interchange operation is performed. Accordingly, profiling information 1116B indicates that performing the loop interchange operation improves the performance of the unit of computation 132A in terms of execution time. As such, and using the profiling information 1116B, a user can determine how the performance of a loop transformation operation (e.g., loop interchange operation) improves/worsens a performance of a unit of computation. Additionally, the user can use the profiling information 1116B to determine which program statements are most affected (e.g., positively or negatively) by the performance of a loop transformation operation. For example, profiling information 1116B indicates that the performance of the loop interchange operation most positively affects code line 11 since its execution time improves from 15.449 seconds to 5.508 seconds when the loop interchange operation is performed.

Although FIGS. 9C and 9D describe generating profiling information that provides a comparison of a unit of computation before and after performing a loop transformation operation, it is expressly contemplated that profiling information may be generated that compares the performance of different loop transformation operations according to the one or more embodiments described herein. For example, profiling information may be generated that compares the performance of a loop interchange operation and performance of a loop parallelize operation for unit of computation 132A. As such, the examples as described herein for generating the profiling information should be taken for illustrative purposes only.

Therefore, a user can utilize the generated profiling information 1116B to, for example, determine if it would be beneficial to perform a particular loop transformation operation based on performance characteristics, and/or determine which loop transformation operation or a plurality of loop transformation operations would be most beneficial in performing based on performance characteristics.

Although the above with respect to FIGS. 9A, 9B, 9C, and 9D describes generating profiling information utilizing a variable name that identifies a loop, it is expressly contemplated that the one or more embodiments described herein may generate profiling information utilizing other identifiers (e.g., syntactical patterns such as, but not limited to, labels, quoted strings, statements, text strings, or other language constructs) that identify loops in a similar manner as described above.

FIG. 10 is example deployment code that implements a unit of computation that may be deployed in a heterogeneous architecture environment utilizing a variable name that is an identifier for a loop according to one or more embodiments described herein. Program code 1200 includes code line 1205 that may be a header for a function named SummingOperationDeploy that includes input information limit, and that has an output variable named out. Program code 1200 may further include unit of computation 132G, of textual program code 102G, which may perform a summing operation from 1 to a limit value that is provided as the input information to code line 1205. The unit of computation 132G includes loop 1206 that is identified by variable name i, for similar reasons as described above.

Program code 1200 may further include code portion 104G. Code portion 104G may be utilized to offload execution of the summing operation of the unit of computation 132G to a GPU of a target system when the summing limit, e.g., limit, reaches a threshold value, e.g., GPUthreshold, which in this example is 1000. Otherwise, the summing operation of the unit of computation 132G may be performed by the processor of the target system. It is expressly contemplated that the threshold value of 1000 is for illustrative purposes only and that any threshold values may be utilized.

When the summing limit is not greater than the threshold, the loop handling module processes the code portion 104G (e.g., from top to bottom) and only adds the is loop scheduling parallelize function 166B of code line 180A to the schedule object 152. GPU deployment function 1250 of code line 1230 is not added to the schedule object 152 when the code portion 104G is processed because the condition of code line 1225 is not satisfied e.g., the summing limit is not greater than the threshold.

The loop handling module may semantically analyze the added loop scheduling parallelize function 166B to identify the variable name i, and then semantically identify loop 1206 that corresponds to variable name i in a similar manner as described above. The loop handling module 999 may perform the loop parallelize operation on the semantically identified loop in a similar manner as described above. Deployment Code (a binary or a textual language such as C or C++ code) may then be generated for the target system in a similar manner as described above, and the deployment code may be executed by the target system (for instance in its processor or GPU unit or elsewhere) as to implement the summing operation.

When the summing limit is greater than the threshold, loop handling module 999 may also processes the code portion 104G (e.g., from top to bottom). When the summing limit is greater than the threshold, the loop handling module 999 adds the loop scheduling parallelize function 166B of code line 180A to the schedule object 152. The loop handling module 999 also adds the 1 GPU deployment function 1250 of code line 1230 to the schedule object 152 because the condition of code line 1225 is satisfied e.g., the summing limit is greater than the threshold. The loop handling module 999 may semantically analyze the added loop scheduling parallelize function 166B and the GPU deployment function 1250 to identify variable name i, and semantically identify the loop 1206 that corresponds to the variable name i in a similar manner as described above. The loop handling module 999 may then perform the loop parallelize operation on semantically identified loop 1206 in a similar manner as described above. In addition, the loop handling module 999 may perform a GPU deployment operation by generating deployment code, e.g., Compute Unified Device Architecture (CUDA) code) for the semantically identified loop 1206, such that loop 1206 is executed by the GPU cores of the target system.

Therefore, different deployment codes may be generated for the target system is based on whether the summing limit is or is not greater than a threshold value and utilizing the variable name i that is an identifier for loop 1206. The different deployment codes are semantically equivalent because they both perform the summing operation as specified in in loop 1206, but are syntactically different because one deployment code is generated for execution on the processor of the target system and the other deployment code is generated for execution on the GPU cores of the target system.

Although the above with respect to FIG. 10 describes generating semantically equivalent but syntactically different deployment codes utilizing a variable name that identifies a loop, it is expressly contemplated that the one or more embodiments described herein may generate semantically equivalent but syntactically different deployment codes utilizing other identifiers (e.g., syntactical patterns such as, but not limited to, labels, quoted strings, statements, text strings, or other language constructs) that identify loops in a similar manner as described above.

Similar techniques as described with reference to FIG. 10 may also be utilized to conditionally interchange loops based on or more different conditions. Specifically, and according to one or more embodiments described herein, a number of loop iterations for nested loops may be used as a condition. For example, and instead of comparing limit to GPUthreshold in FIG. 10, a number of iterations of an innermost loop may be compared to a number of iterations of an outermost loop to determine if performance of a loop interchange operation is preferable or desired.

FIG. 11A is example program code with units of computation that may be analyzed utilizing variable names that identify loops to provide an indication in a code portion regarding a relationship between the units of computation according to one or more embodiments described herein. Program code 1300 includes code line 1305 that may be a header for a function named AddOffSetsTwiceToMatrix that may be utilized to twice add different offset values to different halves of a matrix. The function of code line 1305 includes input information out, offset1, and offset2. In this example, out may be a matrix (matrix out), while offset1 and offset2 may be single integer values. In addition, the function of code line 1305 includes output variable out that stores the output matrix based on the additions of offset1 and offset2.

Textual program code 102H may include code lines 1310 and 1315 that may create variables named row and col, respectively. Row may store a value that is equal to half a number of rows in matrix out provided as the input information, while col may store a value that is equal to a number of columns in matrix out provided as the input information. In addition, code line 1362 is utilized to add the offsets values twice.

Unit of computation 132K includes loop 1325 and loop 1330 that may iterate over ranges to add the value stored in variable named offset1 to an upper half of matrix out. For similar reasons as described above, loop 1325 and loop 1330 of unit of computation 132K are respectively identified by variable names i and j.

Unit of computation 132J may include loop 1335 and loop 1340 that may iterate over ranges to add the value stored in the variable named offset2 to the lower half of matrix out. For similar reasons as described above, loop 1335 and loop 1340 may be identified by variable names m and n.

As explained above, loop fusion may be possible when two loops iterate over the same range but do not reference each other's data. In this example, loop 1325 identified by variable name i and loop 1335 identified by variable name m iterate over the same range of values, e.g., 1:row. However, loops 1325 and 1335 read from and write to the same matrix, e.g., matrix out. Accordingly, there may be ambiguity as to whether there is ordering dependency among loops 1325 and 1335 that would prevent the fusibility of loops 1325 and 1335.

However, a user may be able to evaluate units of computation 132K and 132J and determine that no ordering dependencies exist among loop 1325 and loop 1335 that would prevent the fusibility. As such, the user may provide loop scheduling fusible function 1333 in code line 1345 as an indication regarding a relationship between the units of computation 132K and 132J, and specifically that loops 1325 and 1335 are fusible. The user may, in code line 1345, semantically refer to loops 1325 and 1335 utilizing the variable names i and m to indicate that loops 1325 and 1335 are fusible based on the user analysis/evaluation.

The loop handling module may process code portion 104Z and add the loop scheduling fusible function 1333 to the schedule object 152. The loop handling module 999 may semantically analyze the added loop scheduling fusible function 1333 to identify the variable names i and m, and then semantically identify loops 1325 and 1335 that correspond to the variable names in a similar manner as described above. The loop handling module may then perform the loop fusible operation on the semantically identified loops 1325 and 1335 in a similar manner as described above. Deployment code (e.g., C or C++ Code) for a target system may be generated in a similar manner as described above.

Although the above with respect to FIG. 11A describes providing an indication in a code portion regarding a relationship between units of computation utilizing variable names that identify loops, it is expressly contemplated that the one or more embodiments described herein may provide an indication in a code portion regarding a relationship between units of computation utilizing other identifiers (e.g., syntactical patterns such as, but not limited to, labels, quoted strings, statements, text strings, or other language constructs) that identify loops in a similar manner as described above.

FIG. 11B is example program code with units of computation that may be analyzed utilizing variable names that identify loops to provide an indication in a comment regarding a relationship between the units of computation according to one or more embodiments described herein. Program code 101X includes code line 105X that may be a header for a function named commentExample that may be utilized to perform two matrix multiplication operations. The function of code line 105X includes input information out1, out2, row1, and col2. In this example, out1 and out2 may be matrices, while row1 and col2 may be single integer values. Program code 101X may include unit of computation 132A and unit of computation 955 that may both perform a matrix multiplication operation as described above with reference to FIGS. 1A and 8. As described above, unit of computation 132A may include loops 125, 130, and 135 that are identified by variable names i, j, and k, respectively. Similarly, unit of computation 955 includes loops 922, 923, and 924 that may be identified by variable names x, y, and z, respectively.

As explained above, loop fusion may be possible when two loops iterate over the same range but do not reference each other's data. In this example, loop 125 identified by variable name i and loop 922 identified by variable name x iterate over the same range of values, e.g., 1:row1. However, there may be ambiguity as to whether there is ordering dependency among loops 125 and 922 that would prevent the fusibility of loops 125 and 922.

In an implementation, a user may be able to evaluate units of computation 132A and 955 and determine that no ordering dependencies exist among loop 125 and loop 922 that would prevent the fusibility. As such, the user may provide comment line 1806 as an indication regarding a relationship between the units of computation 132A and 955, and specifically that loops 125 and 922 are fusible. The user may provide comment line 1806, e.g., designated by % in the example of FIG. 11B, which includes a prefix string 1807, e.g., '#LOOPSPEC', that is followed by a loop transformation operation 1808, e.g., fusible. In addition, the user may, in comment line 1806 semantically refer to loops 125 and 922 utilizing variable names i and x to indicate that loops 125 and 922 are fusible based on the user analysis/evaluation.

The loop handling module 999 may semantically analyze comment line 1806 and differentiate comment line 1806 from other comments based on the prefix string 1807. Additionally, the loop handling module 999 may semantically analyze comment line 1806 to identify the variable names i and x in comment line 1806, and then semantically identify loops 125 and 922 that correspond to the variable names in a similar manner as described above. The loop handling module 999 may then perform the loop fusion operation, that is provided in comment line 1806, on the semantically identified loops 125 and 922 in a similar manner as described above. Deployment code (e.g., C or C++ Code) for a target system may be generated in a similar manner as described above.

Although the above with respect to FIG. 11B describes providing an indication in a comment regarding a relationship between units of computation utilizing variable names that identify loops, it is expressly contemplated that the one or more embodiments described herein may provide an indication in a comment regarding a relationship between units of computation utilizing other identifiers (e.g., syntactical patterns such as, but not limited to, labels, quoted strings, statements, text strings, or other language constructs) that identify loops in a similar manner as described above.

FIG. 12A is example program code that utilizes a variable name, which identifies a loop of a unit of computation, that can be used to generate other program code that includes a transformed unit of computation according to one or more embodiments described herein. Program code 101V may include one or more lines of code that may be provided as input to a computing device by a user utilizing, for example, an input device, such as a keyboard, of the computing device. Alternatively, program code 101V may be predefined and provided, at least in part, from an external source, to the computing device.

Program code 101V may include code line 105V that may be a header for a function named xLoopParallelize that may be utilized to execute an element-wise matrix multiplication operation on a target system. The inputs (e.g., u and v) to the function named xLoopParallelize may be the same as described above with respect to code line 105A of FIG. 1A. xLoopParallelize may also include output variable out, which may store an output of the execution of the element-wise matrix multiplication operation.

Program code 101V may include textual program code 102V. Specifically, textual program code 102V may include code lines 192 and 193 that may respectively create variables named row and col. Row may store a value that is equal to the number of rows of matrix u. Col may store a value that is equal to the number of columns of matrix u. Code line 194 may initialize all values of out, which is a row by col sized matrix, to zeros. The values of the created variables may be utilized during execution of the element-wise matrix multiplication operation.

Textual program code 102V may further include unit of computation 132V that includes code lines that correspond to loops 174 and 164 that are utilized to perform the element-wise matrix multiplication operation. Loop 174, which may be an outer loop and started by "for i=1:col", utilizes a variable named i to increment a column position to perform the element-wise matrix multiplication operation. The loop handling module 999 may semantically analyze textual program code 102V and identify the variable name i and determine that because loop 174 is stated utilizing the variable name i, the variable name i can be an identifier that may be utilized to semantically refer to and identify loop 174. Loop 164, which may be an inner loop and started by "for j=1:row", utilizes a variable named j to increment a row position and perform the element-wise matrix multiplication operation. The loop handling module 999 may semantically analyze textual program code 102V and identify the variable name j and determine that because loop 164 is stated utilizing the variable name j, the variable name j can be an identifier that is utilized to semantically refer to and identify loop 164.

The loop handling module 999 may, based on a processing of code portion 104V, add loop scheduling parallelize function 166B of code line 180A to the schedule object 152 in a similar manner as described above. After the loop scheduling parallelize function 166B is added to the schedule object 152, the loop handling module 999 may semantically analyze loop scheduling parallelize function 166B to identify variable name i and determine that the variable name i is an identifier for a loop in the unit of computation 132V in a similar manner as described above. The loop handling module 999 may utilize the identifier, e.g., variable name i, to semantically identify loop 174 in the unit of computation 132V that corresponds to the identifier, e.g., variable name i, in a similar manner as described above. Specifically, loop 174 starts with "for i=1:col" that utilizes variable name i. As such, variable name i can be identified and determined as the identifier for loop 174 in the unit of computation 132A.

As explained above, the apply schedule function 161 of code line 195 executes to semantically identify outer loop 174 by variable name i to then perform the loop parallelize operation. In response to the execution of the apply schedule function 161, the loop handling module 999 may transform the unit of computation 132V to generate a transformed unit of computation that performs the element-wise matrix multiplication operation with loop parallelization. Therefore, a different program code (e.g., different than program code 101V) can be generated from textual program code 102 such that execution of the different program code performs the element-wise matrix multiplication operation with loop parallelization.

Specifically, the loop handling module 999 may semantically identify loop 174 and determine that execution of loop 174 is to be parallelized based on loop scheduling parallelize function 166B being added to schedule object 152. The loop handling module 999 may determine that because execution of the outer loop (e.g., loop 174) is to be parallelized for unit of computation 132V, execution of an outer loop for the transformed unit of computation should be parallelized. Accordingly, and in response to the execution of apply schedule function 161, the loop handling module 999 may generate other program code that includes the transformed unit of computation that performs the element-wise matrix multiplication operation with loop parallelization for the outer loop.

FIG. 12B is example program code that includes a transformed unit of computation that is generated from the unit of computation of FIG. 12A, where the transformed unit of computation performs an operation of the unit of computation and implements a loop transformation operation according to the one or more embodiments described herein. In an embodiment, the transformed unit of computation 132T of program code 101T of FIG. 12B may be generated for a programming environment that is different from the programming environment associated with the unit of computation 132V of FIG. 12A. For example, the transformed unit of computation 132T may be specified or created utilizing a programming language that is different from the programing language utilized to specify or create the unit of computation 132V of FIG. 12A.

Program code 101T may include code line 105T that may be a header for a function named xLoopParallelize that may be utilized to execute an element-wise matrix multiplication operation on a target system. The inputs (e.g., u, v, and out) to the function named xLoopParallelize may be matrices that are a size of 262144 elements (e.g., 512×512 matrices). Additionally, program code 101T may include portion 1212 that initializes variables (e.g., i, j, and out) that are utilized in the unit of computation 132T.

The loop handling module 999 may generate program code 101T with unit of computation 132T that performs the element-wise matrix multiplication operation with loop parallelization in response to the execution of the apply schedule function 161 in program code 101V of FIG. 12A.

Specifically, the loop handling module 999 may generate the unit of computation 132T that includes (1) outer loop 147 that increments a column position for the element-wise matrix multiplication operation and that may correspond to loop 174 of unit of computation 132V, and (2) inner loop 148, which may correspond to loop 164 of unit of computation 132V, that increments a row position and performs the element-wise matrix multiplication operation. Additionally, and because the loop scheduling parallelize function 166B was added to the schedule object 152 of program code 101V, the loop handling module 999 may also generate code line 1215 that parallelizes execution of outer loop 147. Specifically, the loop handling module 999 may generate code line 1215 that includes a pragma construct or a directive construct, e.g., #pragama omp parallel, that specifies that the outer loop 147 of unit of computation 132T should execute in parallel. Accordingly, the unit of computation 132T can be generated for program code 101T to perform an element-wise matrix multiplication operation with execution of the outer loop 147 being parallelized based on the loop scheduling parallelize function 166B being specified or indicated in different program code, e.g., program code 101V.

As the description of FIGS. 8-12B relate to generation of deployment code that may increase execution speed on the target system and/or provide other advantages for the target system that executes the deployment code, the one or more embodiments described herein provide an improvement to a computer itself, e.g., target system.

FIG. 13 is a flow diagram of an example method for identifying loops of a unit of computation using variable names, identifiers or syntactic patterns, and performing one or more operations associated with the loops utilizing the variable names, identifiers or syntactical patterns.

The loop handling module 999, at block 1405, may receive textual program code that includes a unit of computation, wherein the unit of computation comprises one or more loops. In an embodiment, the unit of computation may include an explicit loop statement (e.g., explicit program syntax for a loop), and thus the loop of the unit of computation may be referred to as an explicit loop. For example, and with reference to FIG. 1A, loop 125 is started by explicit loop statement "for i=1:row1", and thus loop 125 may be an explicit loop. When the unit of computation does not include an explicit loop statement (e.g., matrix addition represented by program syntax u+v) but the unit of is computation utilizes a loop, the loop of the unit of computation may be referred to as an implicit loop as described above with reference to FIG. 5. The one or more embodiments described herein may be utilized with explicit and/or implicit loops. The unit of computation, e.g., the loop of the unit of computation, may be associated with an identifier. For example, the identifier may be a variable name within the textual program code. In addition or alternatively, the identifier may be a syntactical pattern (e.g., text string) embedded in the unit of computation. In addition or alternatively, the identifier may be another syntactical pattern (e.g., labels, quoted strings, statements, or other language constructs) that is unique within the unit of computation.

The loop handling module 999, at block 1410, obtains a code portion and/or one or more sections of the code portion that may include the identifier referring to the unit of computation, wherein the code portion and the unit of computation are at locations independent of each other. In an embodiment, the code portion may be scheduling code that, for example, may include one or more loop scheduling functions. Thus, the code portion may be semantically linked to the loop of the unit of computation through the identifier. In an embodiment, the code portion can represent scheduling execution of loops (e.g., performing loop transformation operations), generating reports for loops (e.g., a report indicating that two loops are fusible), generating information for a loop (e.g., execution time for a loop), deploying (including replacing or placing) the unit of computation on a device (e.g., target system) when the unit of computation is implemented in a heterogeneous architecture of the device (e.g., generating syntactically different deployment codes that are semantically equivalent), and/or indicating a relationship between loops (e.g., a user indicating that two loops are fusible).

In an embodiment, the code portion may be in any location in textual program code that contains the unit of computation. In an embodiment, the code portion and the unit of computation may be stored in different files, locations (e.g., arbitrary or independent locations in the same file), modules, other structural elements of a program, or stored at the same or different storage devices. Therefore, the code portion, e.g., loop scheduling function included in the code portion, is not required to be at a particular location with respect to the unit of computation such that the code portion can operate on, for example, the textual program code.

The loop handling module 999, at block 1415, may perform one or more operations on the textual program code that includes the unit of computation using the identifier and at least a section of the code portion. Specifically, and in an embodiment, the methods and systems may identify the unit of computation or a part of the unit of computation using the identifier included in the section of the code portion. For example, a loop corresponding to the identifier included in the section of the code portion is identified. In an embodiment, and based on the identifying, the process may perform the one or more operations on the textual program code, e.g., unit of computation of the textual program code, utilizing the section of the code portion.

For example, the one or more operations performed on the textual program code may comprise one or more of: (1) analyzing the unit of computation, wherein the analyzing includes identifying one or more properties of the unit of computation (e.g., two loops iterate over the same range) or determining a relationship between the unit of computation and another unit of computation (e.g., two loops are fusible), (2) transforming the unit of computation, wherein the transforming includes scheduling execution of the unit of computation (e.g., performing a loop transformation operation on a loop or the executable code generated from the unit of computation utilizing an identifier for the loop) or modifying an execution of one or more particular loops associated with the unit of computation (e.g., parallelizing a loop) as described above with reference to FIGS. 1A-7C, (3) deploying or placing the unit of computation on a hardware system or a heterogenous architecture, e.g., semantically equivalent deployment codes that are syntactically different may be generated from the same unit of computation utilizing an identifier for a loop as described above with reference to FIG. 10, (4) instrumenting the unit of computation, wherein the instrumenting includes inserting one or more instructions into the unit of computation as described above with reference to FIGS. 9A and 9B, and/or (5) generating a report or information for the unit of computation as described above with reference to FIG. 8.

In an embodiment, deployment code (e.g., C or C++ code) may then be generated for a target system.

FIGS. 14A-14E are schematic, partial illustrations of example programming environments in accordance with one or more embodiments described herein. Programming environments 1500A-D of FIGS. 14A-D may include a User Interface (UI) engine 1502, a program editor 1504, a program library 1506, a compiler 1511, a code generator 1512, an interpreter 1514, an IR builder, 1510, and a loop handling module 999, also described infra. Programming environment 1500E of FIG. 14E may include UI engine 1502, a program editor 1504, a program library 1506, a compiler/code generator 1508, an interpreter 1514, an IR builder, 1510, and a loop handling module 999.

The UI engine 1502 may create and present one or more User Interfaces (UIs), such as command line interfaces (CLIs) and/or Graphical User Interfaces (GUIs), on the display of a workstation, laptop, tablet, or other data processing device. The CLIs and GUIs may provide a user interface to the programming environment (e.g., 1500A-E), such as a program editing window. Other CLIs and GUIs may be generated as user interfaces to the loop handling module 999. The program library 1506 may contain one or more programs, e.g., textual program code 102 and/or code portion 104, according to the one or more embodiments described herein. Some of the programs contained in the program library 1506 may come preloaded with the programming environment (e.g., 1500A-E), while others may be custom created and saved in the library 1506, e.g., by a user. A user may select a program from the program library 1506, and the program editor 1504 may add instances of the selected program to other programs, may display the program on the display device, may execute the program, and/or may load the program such that the program may be searched according to the one or more embodiments described herein. The program editor 1506 may also perform selected operations on a program, such as open, create, edit, and save, in response to user inputs or programmatically.

In addition or alternatively, the programming environment (e.g., 1500A-E) may access or receive programs, e.g., textual program code 102 and/or code portion 104, from a computer memory or transmitted from a local or remote device, etc., as indicated by arrow 222, which may then be utilized to perform the one or more embodiments described herein.

In addition, compiler 1511 of programming environments 1500A-D may perform a series of processes on the textual program code. Such processes may include, but are not limited to, lexical analysis, parsing, semantic analysis (syntax-directed translation), conversion of the textual program code to an intermediate representation, code optimization, scheduling, etc. Code generator 1512 of programming environments 1500A-D may generate deployment code from the textual program code and for the target system, where the deployment code implements the unit of computation on the target system. The generated code may be textual code, such as textual source code, that may be executed on a target machine or device (i.e., target system). The generated code may conform to one or more programming languages, such as Ada, Basic, C, C++, C#, SystemC, FORTRAN, VHDL, Verilog, MATLAB/embedded MATLAB, a vendor or target specific HDL code, such as Xilinx FPGA libraries, assembly code, etc. The generated code may include header, main, make, and other source files. The generated code may be executed by target hardware, such as a microprocessor, a Digital Signal Processor (DSP), etc. In some embodiments, the generated code may be accessed by a hardware synthesis tool chain, which may configure a programmable hardware device, such as a Field Programmable Gate Array (FPGA), a System on a Chip (SoC), etc., from the generated code. The compiler/code generator 1508 of programming environment 1500E may perform the compilation and code generation as described above.

The loop handling module 999 may perform the one or more embodiments described herein. In an implementation, a loop handling module 999 may be part of compiler 1511 as depicted in FIG. 14A. In an implementation, the loop handling module 999 may be part of code generator 1512 as depicted in FIG. 14B. In an implementation, the loop handling module 999 may be part of compiler/code generator 1508 as depicted in FIG. 14E. In an implementation, the loop handling module 999 may be part of an interpreter 1514 as depicted in FIG. 14C. In an implementation, the loop handling module 999 may be independent of a compiler, a code generator, a compiler/code generator, an interpreter, and/or a processor as depicted in FIG. 14D. In an implementation, the loop handling module 999 may be hardware and internal to processor 2002 of a data processing system 2000 of FIG. 15.

Exemplary programming environments 1500A-E suitable for use with the present disclosure include, but are not limited to, the MATLAB® language/programming environment and the Simulink® simulation environment both from The MathWorks, Inc. of Natick, Mass., as well as Visual Studio® from Microsoft Corp of Redwood Calif., Python, Julia, Octave, C, C++, C#, SystemC, FORTRAN, Java, Javascript, Swfit, etc.

In some embodiments, the programming environments (e.g., 1500A-E) and/or the loop handling module 999 may be implemented through one or more software modules or libraries containing program instructions that perform the methods described herein, among other methods. The software modules may be stored in one or more memories, such as a main memory, a persistent memory, and/or a computer readable media, of a data processing device, and may be executed by one or more processors. Other computer readable media may also be used to store and execute these program instructions, such as one or more non-transitory computer readable media, including optical, magnetic, or magneto-optical media. In other embodiments, one or more of the programming environment (e.g., 1500A-E) and/or the loop handling module 999 may be implemented in hardware, for example through hardware registers and combinational logic configured and arranged to produce sequential logic circuits that implement the methods described herein. In other embodiments, various combinations of software and hardware, including firmware, may be utilized to implement the systems and methods of the present disclosure. FIGS. 14A-E are for illustrative purposes only and the present disclosure may be implemented in other ways.

Figure 15:
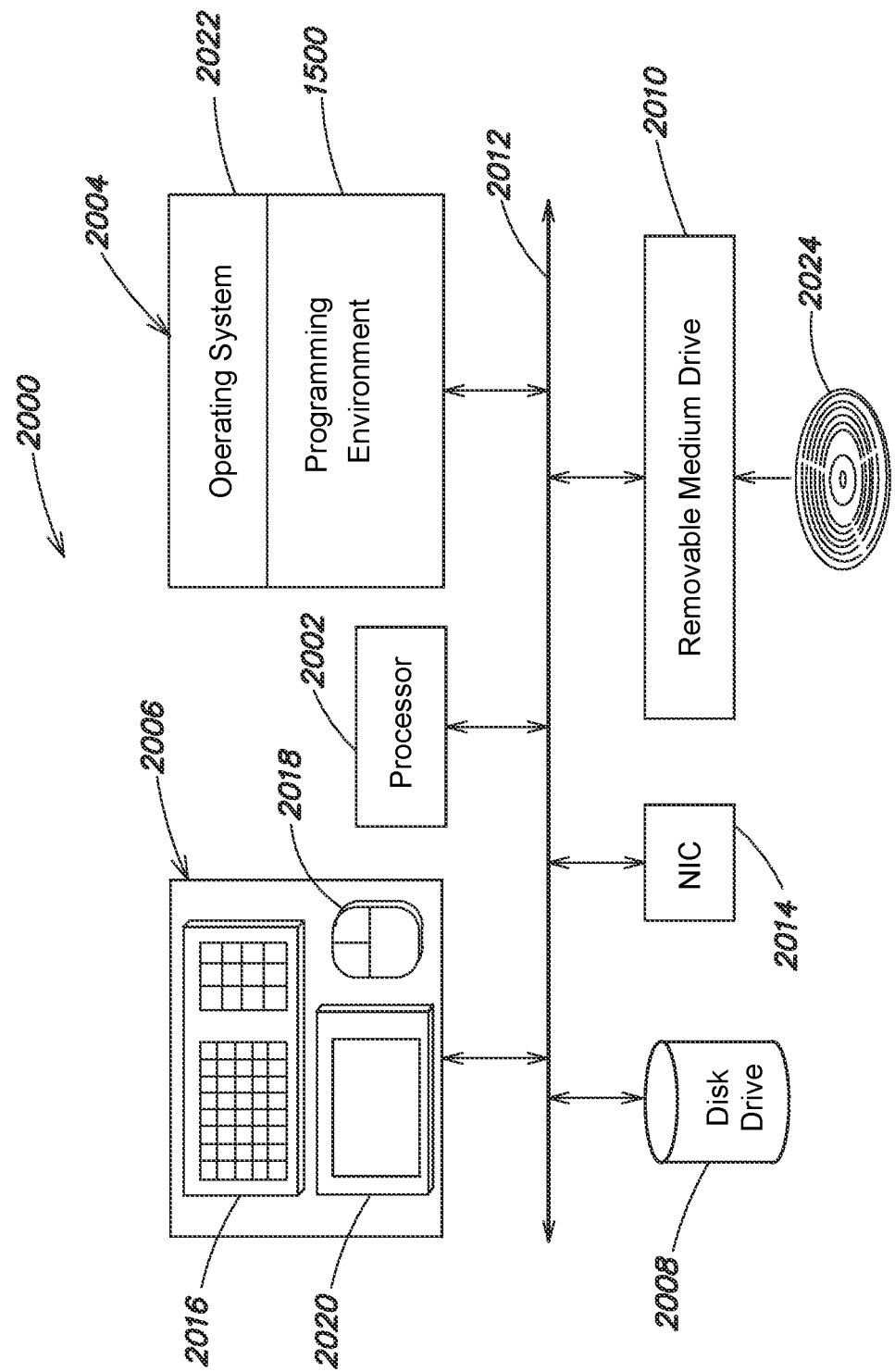
FIG. 15 is a schematic illustration of a computer or data processing system for implementing one or more embodiments described herein.

FIG. 15 is a schematic illustration of a computer or data processing system 2000 for implementing one or more embodiments described herein. The computer system 2000 may include one or more processing elements, such as processor 2002, a main memory 2004, user input/output (I/O) 2006, a persistent data storage unit, such as a disk drive 2008, and a removable medium drive 2010 that are interconnected by a system bus 2012. The computer system 2000 may also include a communication unit, such as a network interface card (NIC) 2014. The user I/O 2006 may include a keyboard 2016, a pointing device, such as a mouse 2018, and a display 2020. Other user I/O 2006 components include voice or speech command systems, other pointing devices include touchpads and touchscreens, and other output devices besides a display, include a printer, a projector, a touchscreen, etc. Exemplary processing elements include single or multi-core processors, e.g., Central Processing Units (CPUs), Graphics Processing Units (GPUs), Field Programmable Gate Arrays (FPGAs), Application Specific Integrated Circuits (ASICs), microprocessors, microcontrollers, etc.

The main memory 2004, which may be a Random Access Memory (RAM), may store a plurality of program libraries or modules, such as an operating system 2022, and one or more application programs that interface to the operating system 2022, such as the programming environment (e.g., 1500A-E). One or more objects or data structures may also be stored in the main memory 2004, such as programs, code portions, among other data structures.

The removable medium drive 2010 may accept and read one or more computer readable media 2024, such as a CD, DVD, floppy disk, solid state drive, tape, flash memory or other media. The removable medium drive 2010 may also write to the one or more computer readable media 2024.

Suitable computer systems include personal computers (PCs), workstations, servers, laptops, tablets, palm computers, smart phones, electronic readers, and other portable computing devices, etc. Nonetheless, those skilled in the art will understand that the computer system 2000 of FIG. 15 is intended for illustrative purposes only, and that the present disclosure may be used with other computer systems, data processing systems, or computational devices. The present disclosure may also be used in a networked, e.g., client-server, computer architecture, or a public and/or private cloud computing arrangement. For example, the programming environment (e.g., 1500A-E) may be hosted on a server, and accessed by a remote client through an application hosting system, such as the Remote Desktop Connection tool from Microsoft Corp.

Suitable operating systems 2022 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of is operating systems, among others. The operating system 2022 may provide services or functions for other modules, such as allocating memory, organizing data according to a file system, prioritizing requests, etc. The operating system 2022 may run on a virtual machine, which may be provided by the data processing system 2000.

As indicated above, a user or developer, such as an engineer, scientist, programmer, etc., may utilize one or more input devices, such as the keyboard 2016, the mouse 2018, and the display 2020 to operate the programming environment (e.g., 1500A-E), and construct one or more programs that may be stored in program library 206.

Figure 16:
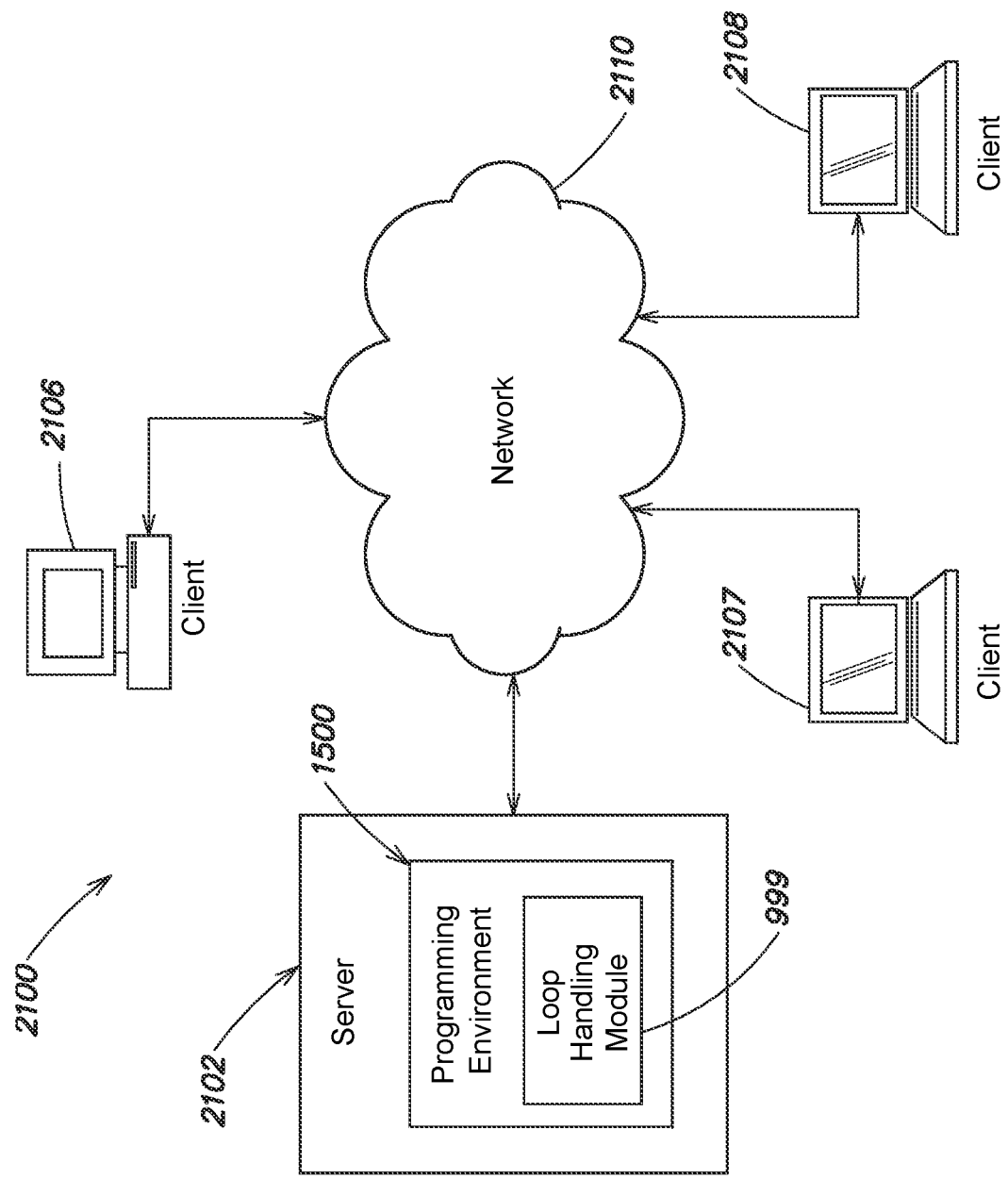
FIG. 16 is a schematic diagram of a distributed computing environment in which systems and/or methods described herein may be implemented.

FIG. 16 is a schematic diagram of a distributed computing environment 2100 in which systems and/or methods described herein may be implemented. The environment 2100 may include client and server devices, such as server 2102, and three clients 2106-2108, interconnected by one or more networks, such as network 2110. The devices of the environment 2100 may be interconnected via wired connections, wireless connections, or a combination of wired and wireless connections. The server 2102 may include one or more devices capable of receiving, generating, storing, processing, executing, and/or providing information. For example, the server 2102 may include a computing device, such as a server, a desktop computer, a laptop computer, a tablet computer, a handheld computer, or a similar device.

The clients 2106-2108 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 2106-2108 may download data and/or code from the server 2102 via the network 2110. In some implementations, the clients 2106-2108 may be desktop computers, workstations, laptop computers, tablet computers, handheld computers, mobile phones (e.g., smart phones, radiotelephones, etc.), electronic readers, or similar devices. In some implementations, the clients 2106-2108 may receive information from and/or transmit information to the server 2102.

The network 2110 may include one or more wired and/or wireless networks. For example, the network 2110 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The server 2102 may host applications or processes accessible by the clients 2106-2108. For example, the server 2102 may include the programming environment (e.g., 1500A-E), which may include or have access to the loop handling module 999.

The number of devices and/or networks shown in FIG. 16 is provided as an example. In practice, there may be additional devices and/or networks, fewer devices and/or networks, different devices and/or networks, or differently arranged devices and/or networks than those shown in FIG. 16. Furthermore, two or more devices shown in FIG. 16 may be implemented within a single device, or a single device shown in FIG. 16 may be implemented as multiple, distributed devices. Additionally, one or more of the devices of the distributed computing environment 2100 may perform one or more functions described as being performed by another one or more devices of the environment 2100.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagram, the order of the acts may be modified in other implementations. In addition, the acts, operations, and steps may be performed by additional or other modules or entities, which may be combined or separated to form other modules or entities. Further, non-dependent acts, operations, and steps may be performed in parallel. Also, the term "user", as used herein, is intended to be broadly interpreted to include, for example, a computer or data processing system (e.g., system 2000) or a human user of a computer or data processing system, unless otherwise stated.

Further, certain embodiments described herein may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 2000. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages.

What is claimed is:

1. One or more non-transitory computer-readable media, having stored thereon instructions that when executed by a computing device, cause the computing device to perform operations comprising:
    receiving textual program code, wherein the textual program code comprises
        a unit of computation within textual program code, wherein the unit of computation comprises (1) one or more explicit loops or (2) a unit of computation operation that uses one or more loops when the unit of computation operation is implemented on a device;
    obtaining a code portion including a section that when executed utilizes the unit of computation to perform one or more selected operations for the textual program code, wherein the section includes an identifier referring to the unit of computation,
        wherein the identifier comprises a variable name within the textual program code, a text string embedded in the unit of computation, or a syntactical pattern that is unique within the unit of computation, and
        wherein a location of the code portion is independent of where the unit of computation is located in the textual program code; and
    performing the one or more selected operations on the textual program code using the section that refers to the unit of computation, wherein performing the one or more selected operations comprises
    identifying the unit of computation or a part of the unit of computation using the identifier included in the section of the code portion.

2. The one or more non-transitory computer-readable media of claim 1, wherein the instructions cause the computing device to perform operations further comprising generating another program code from the textual program code, such that execution of the another program code performs the unit of computation.

3. The one or more non-transitory computer-readable media of claim 2, wherein the another program code includes one or more directives or pragmas that affect a performance of the unit of computation.

4. The one or more non-transitory computer-readable media of claim 1, wherein the identifier appears only once in the unit of computation.

5. The one or more non-transitory computer-readable media of claim 1, where the unit of computation and the code portion are stored in (1) the textual program code at different locations, (2) different files, (3) arbitrary or independent locations in a same file, (4) different modules, (5) other structural elements of the textual program code, (6) a same storage devices, or (7) different storage devices.

6. The one or more non-transitory computer-readable media of claim 1, wherein the textual program code is based on an imperative programming language or a procedural programming language.

7. The one or more non-transitory computer-readable media of claim 1, wherein the instructions cause the computing device to perform operations further comprising generating a new unit of computation based on a first part of the code portion, wherein a second part of the code portion refers to the new unit of computation and s performs a particular operation on the new unit of computation.

8. The one or more non-transitory computer-readable media of claim 1, wherein the one or more operations are performed on the textual code during a code generation process, a compilation process, or a translation process for generating target code for deployment on the device.

9. The one or more non-transitory computer-readable media of claim 1, wherein the instructions cause the computing device to perform operations further comprising:
   analyzing the unit of computation, wherein the analyzing includes (1) identifying one or more properties of the unit of computation or (2) determining a relationship between the unit of computation and another unit of computation; and
   generating a report that indicates the one or more properties or the relationship.

10. The one or more non-transitory computer-readable media of claim 9, wherein the instructions cause the computing device to perform operations further comprising:
    automatically performing the one or more operations on the textual program code in response to user input based on the generated report.

11. The one or more non-transitory computer-readable media of claim 1, wherein the one or more operations comprise transforming the unit of computation, wherein the transforming includes scheduling execution of the unit of computation or modifying an execution of one or more particular loops associated with the unit of computation.

12. The one or more non-transitory computer-readable media of claim 1, wherein the one or more operations comprise deploying or placing the unit of computation in a hardware system or a heterogeneous architecture.

13. The one or more non-transitory computer-readable media of claim 1, wherein the one or more operations comprise instrumenting the unit of computation, wherein the instrumenting includes inserting one or more selected instructions into the unit of computation.

14. The one or more non-transitory computer-readable media of claim 1, wherein the one or more operations comprise generating at least one of (1) a report or information for the unit of computation, or (2) a different report or different information comparing different performances of the one or more selected operations.

15. The one or more non-transitory computer-readable media of claim 1, wherein the one or more loops used by the unit of computation are one or more implicit loops or one or more array-based operations.

16. A method comprising:
   receiving textual program code, wherein the textual program code comprises
      a unit of computation within textual program code, wherein the unit of computation comprises (1) one or more explicit loops, or (2) a unit of computation operation that uses one or more loops when the unit of computation operation is implemented on a device;
   obtaining a code portion including a section that when executed utilizes the unit of computation to perform one or more operations for the textual program code, wherein the section includes an identifier referring to the unit of computation,
      wherein the identifier comprises a variable name within the textual program code, a text string embedded in the unit of computation, or a syntactical pattern that is unique within the unit of computation, and
      wherein a location of the code portion is independent of where the unit of computation is located in the textual program code; and
   performing the one or more operations on the textual program code using the section that refers to the unit of computation, wherein performing the one or more operations comprises
   identifying the unit of computation or a part of the unit of computation using the identifier included in the section of the code portion.

17. The method of claim 16, wherein the one or more operations comprises generating another program code from the textual program code, such that execution of the another program code performs the unit of computation.

18. The method of claim 16, wherein
   the unit of computation and the code portion are stored in (1) the textual program code at different locations, (2) different files, (3) arbitrary or independent locations in a same file, (4) different modules, (5) other structural elements of the textual program code, (6) a same storage devices, or (7) different storage devices, or
   the textual program code is based on an imperative programming language or a procedural programming language, and the one or more operations are performed on the textual code during a code generation process, a compilation process, or a translation process for generating target code for deployment on the device.

19. A system, comprising:
   a processor coupled to a memory, the processor configured to:
      receive textual program code, wherein the textual program code comprises
         a unit of computation within textual program code, wherein the unit of s computation comprises (1) one or more explicit loops, or (2) a unit of computation operation that uses one or more loops when the unit of computation operation is implemented on a device
      obtain a code portion including a section that when executed utilizes the unit of computation to perform one or more operations for the textual program code, wherein the section includes an identifier referring to the unit of computation,
         wherein the identifier comprises a variable name within the textual program code, a text string embedded in the unit of computation, or a syntactical pattern that is unique within the unit of computation, and
         wherein a location of the code portion is independent of where the unit of computation is located in the textual program code; and perform the one or more operations on the textual program code using the section that refers to the unit of computation, wherein performing the one or more operations comprises identify the unit of computation or a part of the unit of computation using the identifier included in the section of the code portion.

20. The system of claim 19, wherein the unit of computation and the code portion are stored in (1) the textual program code at different locations, (2) different files, (3) arbitrary or independent locations in a same file, (4) different modules, (5) other structural elements of the textual program code, (6) a same storage devices, or (7) different storage devices, the textual program code is based on an imperative programming language or a procedural programming language, the one or more operations are performed on the textual code during a code generation process, a compilation process, or a translation process for generating target code for deployment on the device, or another program code from the textual program code is generated, such that execution of the another program code performs the unit of computation.

\* \* \* \* \*

UNITED STATES PATENT AND TRADEMARK OFFICE
CERTIFICATE OF CORRECTION

PATENT NO. : 11,556,357 B1
APPLICATION NO. : 17/212468
DATED : January 17, 2023
INVENTOR(S) : Sumit Ghosh et al.

It is certified that error appears in the above-identified patent and that said Letters Patent is hereby corrected as shown below:

In the Specification

Column 7, Line 43:
"else statements) is that define different conditions."
Should read:
"else statements) that define different conditions."

Column 8, Line 10:
"135 utilizing variable names i, j, and kin the creation/"
Should read:
"135 utilizing variable names i, j, and k in the creation/"

Column 11, Line 36:
"memory is layout is not utilized. The variable name i that"
Should read:
"memory layout is not utilized. The variable name i that"

Column 11, Line 38:
"input information (e.g. T) for the loop scheduling parallelize"
Should read:
"input information (e.g. "i") for the loop scheduling parallelize"

Column 12, Line 12:
"inner loop working on a smaller block of data to is improve"
Should read:
"inner loop working on a smaller block of data to improve"

Column 12, Line 55:
"Thus, the loop scheduling is tiling functions 168A and 168E"

Signed and Sealed this
Fourteenth Day of May, 2024

Katherine Kelly Vidal
*Director of the United States Patent and Trademark Office*

Should read:
"Thus, the loop scheduling tiling functions 168A and 168E"

Column 13, Line 32:
"and k, and then performing is the loop interchange and"
Should read:
"and k, and then performing the loop interchange and"